United States Patent
Nomura et al.

[11] Patent Number: 5,956,096
[45] Date of Patent: Sep. 21, 1999

[54] STRESS MITIGATING METHOD FOR VIDEO DISPLAY TERMINAL

[75] Inventors: Masahide Nomura; Hitoshi Igarashi, both of Tokyo, Japan

[73] Assignee: NEC Corporation, Japan

[21] Appl. No.: 09/083,338

[22] Filed: May 22, 1998

Related U.S. Application Data

[62] Division of application No. 08/541,275, Oct. 12, 1995, Pat. No. 5,796,445.

[30] Foreign Application Priority Data

| Oct. 12, 1994 | [JP] | Japan | 6-246455 |
| Feb. 14, 1995 | [JP] | Japan | 7-024872 |
| Apr. 26, 1995 | [JP] | Japan | 7-101977 |

[51] Int. Cl.$^6$ .............................. H04N 7/01; H04N 5/21
[52] U.S. Cl. .................... 348/607; 348/910; 348/625; 348/665; 348/666; 345/136; 382/260; 382/264
[58] Field of Search .............................. 348/607, 625, 348/628, 629, 630, 665, 666, 667, 668, 447, 910; 345/133, 135, 136, 147, 148, 3; 382/260, 261, 264; H04N 7/01, 5/21

[56] References Cited

U.S. PATENT DOCUMENTS

| 4,218,700 | 8/1980 | Kashigi | 348/665 |
| 4,454,506 | 6/1984 | Netravali et al. | 345/136 |
| 4,568,964 | 2/1986 | Doornhein | 348/910 |
| 4,612,567 | 9/1986 | Pritchard | 348/451 |
| 5,268,790 | 12/1993 | Suyama | 348/607 |
| 5,276,512 | 1/1994 | Onda | 348/620 |
| 5,289,282 | 2/1994 | Tsuji et al. | 348/607 |
| 5,294,984 | 3/1994 | Mori et al. | 348/625 |
| 5,321,512 | 6/1994 | Huang | 348/607 |
| 5,323,239 | 6/1994 | Ward et al. | 348/607 |
| 5,327,240 | 7/1994 | Golston et al. | 348/607 |
| 5,349,444 | 9/1994 | Amano et al. | 348/607 |
| 5,369,448 | 11/1994 | Lee | 348/668 |
| 5,394,276 | 2/1995 | Adachi | 348/910 |
| 5,434,591 | 7/1995 | Goto et al. | 345/123 |
| 5,450,138 | 9/1995 | Tomimatsu et al. | 348/910 |
| 5,640,211 | 6/1997 | Kawano et al. | 348/665 |
| 5,796,445 | 8/1998 | Nomura et al. | 348/607 |
| 5,822,008 | 10/1998 | Inoue et al. | 348/910 |

*Primary Examiner*—John K. Peng
*Assistant Examiner*—Linus H. Lo
*Attorney, Agent, or Firm*—Ostrolenk, Faber, Gerb & Soffen, LLP

[57] ABSTRACT

In a video display terminal (VDT) adapter connected to a moving picture output device, inputting means inputs, from the moving picture output device, an input moving picture signal indicative of input moving pictures having brightness which changes drastically. Connected to the inputting means, picture temporal frequency attenuator means selectively attenuates a particular frequency band of the input moving picture signal to produce a smoothly-changing moving picture signal indicative of smoothly-changing moving pictures. The particular frequency band includes human sensitive frequency components. Connected to the picture temporal frequency attenuator means, outputting means outputs the smoothly-changing moving picture signal as an output moving picture signal. The particular frequency band may lie on a range not less than 7 Hz.

49 Claims, 12 Drawing Sheets

STRESS MITIGATING METHOD FOR VIDEO DISPLAY TERMINAL

This is a division of application Ser. No. 08/541,275, filed Oct. 12, 1995 now U.S. Pat. No. 5,796,445.

BACKGROUND OF THE INVENTION

This invention relates to a method of mitigating stress which occurs in a terminal user of a video display terminal (VDT).

The video display terminal (VDT) is also called a visual display terminal. The VDT is used as name generically of display devices, for example, cathode-ray tube (CRT) display for a television, for a video tape recorder, and for a computer, a liquid crystal display for a television game and so on. The VDT has a display screen on which a video signal is displayed.

As is well known in the art, the video signal represents successive pictures each of which may corresponds to a frame of the input video signal when the input video signal is, for example, a television signal. Each picture or frame consists of a plurality of picture elements (pixels).

As is well known in the art, stress disease occurs in the terminal user of the VDT by continuously seeing for a long time interval the display screen of the VDT on which the video signal is displayed. Such stress disease is called VDT stress disease. To prevent or mitigate the VDT stress disease, various implements to cover the display screen have been already proposed and used. Such implements are called stress mitigating implements. The stress mitigating implements are, for example, a filter with low index of reflection or an electrostatic preventing filter. These stress mitigating implements are effective to reduce the VDT stress disease of the terminal user in employment environment so that the display screen of the VDT displays the video signal representative of pictures which are practically at rest. Such displayed pictures are called pseudo-still pictures which are, for example, pictures displayed on the display screen when a document is prepared by using a word processor or a personal computer loaded with a word processing program.

Recent developments in computer graphics (CG) technique or virtual reality technique have made it possible to display various images (moving pictures) on the display screen such as a television screen or a computer display screen. Such images frequently include the moving pictures where a glaring figure moves quickly or flashes on and off hard. Such moving pictures whose luminance temporarily changes violently are very effective to draw attention of the VDT user who sees the moving pictures. On the other hand, such moving pictures whose luminance temporarily changes violently put a lot of stress on the VDT user. Many opportunities of seeing on the television screen or the computer display screen stimulative moving pictures processed by the CG technique and so on result in a new type of VDT stress disease. Accordingly, a prevention of the new type of the VDT stress disease is demanded. However, the new type of the VDT stress disease cannot be effectively prevented by using the above-mentioned conventional stress mitigating implements that improve a static characteristic of the picture display device. As a result, an effective means of its prevention is required.

SUMMARY OF THE INVENTION

It is therefore an object of this invention to mitigate VDT stress disease of a VDT user that is led by continuously seeing a video signal indicative of moving pictures displayed on a display screen of a VDT.

Other objects of this invention will become clear as the description proceeds.

On describing the gist of an aspect of this invention, it is possible to understand that a method mitigates stress disease of a user that is led by continuously seeing a video signal on a video display terminal. An input moving picture signal indicates input moving pictures and has brightness which changes drastically.

According to this invention, the above-understood method comprises the step of transforming the input moving pictures into output moving pictures with a particular frequency band of the input moving picture signal attenuated to produce an output moving picture signal indicative of the output moving pictures as the video signal. The particular frequency band includes human sensitive frequency components.

On describing the gist of a different aspect of this invention, it is possible to understand that a video display terminal (VDT) adapter is connected to a moving picture output device.

According to an aspect of this invention, the above-understood VDT adapter comprises inputting means, connected to the moving picture output device, for inputting, from the moving picture output device, an input moving picture signal indicative of input moving pictures having brightness which changes drastically. Connected to the inputting means, picture temporal frequency attenuator means selectively attenuates a particular frequency band of the input moving picture signal to produce a smoothly-changing moving picture signal indicative of smoothly-changing moving pictures. The particular frequency band includes human sensitive frequency components. Connected to the picture temporal frequency attenuator means, outputting means outputs the smoothly-changing moving picture signal as an output moving picture signal.

According to the invention, a picture temporal frequency attenuating device selectively attenuates a particular frequency band of an input analog moving picture signal indicative of input moving pictures supplied from a moving picture output device of non-interlaced scanning type to produce a smoothly-changing analog moving picture signal indicative of selectively frequency attenuated moving pictures. The particular frequency band includes human sensitive frequency components. The picture temporal frequency attenuating device comprises a picture separator for separating the input analog moving picture signal into an input analog luminance signal and input analog chromaticity signals. Connected to the picture separator, an analog-to-digital converter converts the input analog luminance signal into an input digital luminance signal indicative of luminance values of the input analog moving picture signal. Connected to the analog-to-digital converter, a temporal filter carries out temporal filtering processing on the input digital luminance signal to attenuate the particular frequency band of the input digital luminance signal. The temporal filter produces a temporally filtered digital luminance signal. Connected to the temporal filter, a digital-to-analog converter converts the temporally filtered digital luminance signal into a temporally filtered analog luminance signal. Connected to the digital-to-analog converter and the picture separator, a picture combiner combines the temporally filtered analog luminance signal with the input analog chromaticity signals to produce the smoothly-changing analog moving picture signal.

According to the invention, a picture temporal frequency attenuating device selectively attenuates a particular frequency band of an input analog moving picture signal indicative of input moving pictures supplied from a moving picture output device of interlaced scanning type to produce a smoothly-changing analog moving picture signal indicative of selectively frequency attenuated moving pictures. The particular frequency band includes human sensitive frequency components. The picture temporal frequency attenuating device comprises a picture separator for separating the input analog moving picture signal into an input analog luminance signal and input analog chromaticity signals. Connected to the picture separator, an analog-to-digital converter converts the input analog luminance signal into an input digital luminance signal indicative of luminance values of the input analog moving picture signal. Connected to the analog-to-digital converter, an interlace distributor distributes the input digital luminance signal into an input odd-field digital luminance signal and an input even-field digital luminance signal. Connected to the interlace distributor, a temporal filter carries out temporal filtering processing on the input odd-field digital luminance signal and on the input even-field digital luminance signal to attenuate the particular frequency band of the input odd-field digital luminance signal and of the input even-field digital luminance signal. The temporal filter produces a temporally filtered odd-field digital luminance signal and a temporally filtered even-field digital luminance signal. Connected to the temporal filter, an interlace combiner temporally and alternately combines the temporally filtered odd-field digital luminance signal with the temporally filtered even-field digital luminance signal to produce a temporally filtered digital luminance signal. Connected to the interlace combiner, a digital-to-analog converter converts the temporally filtered digital luminance signal into a temporally filtered analog luminance signal. Connected to the digital-to-analog converter and the picture separator, a picture combiner combines the temporally filtered analog luminance signal with the input analog chromaticity signals to produce the smoothly-changing analog moving picture signal.

According to the invention, a picture temporal frequency attenuating device selectively attenuates a particular frequency band of an input analog moving picture signal indicative of input moving pictures supplied from a moving picture output device of non-interlaced scanning type to produce a smoothly-changing analog moving picture signal indicative of selectively frequency attenuated moving pictures. The particular frequency band includes human sensitive frequency components. The picture temporal frequency attenuating device comprises a picture separator for separating the input analog moving picture signal into an input red analog moving picture signal, an input green analog moving picture signal, and an input blue analog moving picture signal. Connected to the picture separator, a first analog-to-digital converter converts the input red analog moving picture signal into an input red digital moving picture. Connected to the picture separator, a second analog-to-digital converter converts the input green analog moving picture signal into an input green digital moving picture. Connected to the picture separator, a third analog-to-digital converter converts the input blue analog moving picture signal into an input blue digital moving picture. Connected to the first analog-to-digital converter, a first temporal filter carries out temporal filtering processing on the input red digital moving picture signal to attenuate the particular frequency band of the input red digital moving picture signal. The first temporal filter produces a temporally filtered red digital moving picture signal. Connected to the second analog-to-digital converter, a second temporal filter carries out temporal filtering processing on the input green digital moving picture signal to attenuate the particular frequency band of the input green digital moving picture signal. The second temporal filter produces a temporally filtered green digital moving picture signal. Connected to the third analog-to-digital converter, a third temporal filter carries out temporal filtering processing on the input blue digital moving picture signal to attenuate the particular frequency band of the input blue digital moving picture signal. The third temporal filter produces a temporally filtered blue digital moving picture signal. Connected to the first temporal filter, a first digital-to-analog converter converts the temporally filtered red digital moving picture signal into a temporally filtered red analog moving picture signal. Connected to the second temporal filter, a second digital-to-analog converter converts the temporally filtered green digital moving picture signal into a temporally filtered green analog moving picture signal. Connected to the third temporal filter, a third digital-to-analog converter converts the temporally filtered blue digital moving picture signal into a temporally filtered blue analog moving picture signal. Connected to the first through the third digital-to-analog converters, a picture combiner combines the temporally filtered red analog moving picture signal, the temporally filtered green analog moving picture signal, and the temporally filtered blue analog moving picture signal to produce the smoothly-changing analog moving picture signal.

According to the invention, a picture temporal frequency attenuating device selectively attenuates a particular frequency band of an input analog moving picture signal indicative of input moving pictures supplied from a moving picture output device of non-interlaced scanning type to produce a smoothly-changing analog moving picture signal indicative of selectively frequency attenuated moving pictures. The particular frequency band includes human sensitive frequency components. The picture temporal frequency attenuating device comprises a picture separator for separating the input analog moving picture signal into an input red analog moving picture signal, an input green analog moving picture signal, and an input blue analog moving picture signal. Connected to the picture separator, a first analog-to-digital converter converts the input red analog moving picture signal into an input red digital moving picture. Connected to the picture separator, a second analog-to-digital converter converts the input green analog moving picture signal into an input green digital moving picture. Connected to the picture separator, a third analog-to-digital converter converts the input blue analog moving picture signal into an input blue digital moving picture. Connected to the first through the third analog-to-digital converters, a temporal filter time-sharedly carries out temporal filtering processing on the input red digital moving picture signal, on the input green digital moving picture signal, and on the input blue digital moving picture signal to attenuate the particular frequency band of the input red digital moving picture signal, of the input green digital moving picture signal, and of the input blue digital moving picture signal. The temporal filter produces a temporally filtered red digital moving picture signal, a temporally filtered green digital moving picture signal, and a temporally filtered blue digital moving picture signal. Connected to the temporal filter, a first digital-to-analog converter converts the temporally filtered red digital moving picture signal into a temporally filtered red analog moving picture signal. Connected to the temporal filter, a second digital-to-analog converter converts the temporally filtered green digital moving picture signal into a temporally filtered green analog moving picture signal. Connected to the temporal filter, a third digital-to-analog converter converts the temporally filtered blue digital moving picture signal into a temporally filtered blue analog moving picture signal. Connected to the first through the third digital-to-analog converters, a picture combiner combines the temporally filtered red analog moving picture signal, the temporally filtered green analog moving picture signal, and the temporally filtered blue analog moving picture signal to produce the smoothly-changing analog moving picture signal.

According to the invention, a picture temporal frequency attenuating device selectively attenuates a particular frequency band of an input analog moving picture signal indicative of input moving pictures supplied from a moving picture output device of interlaced scanning type to produce a smoothly-changing analog moving picture signal indicative of selectively frequency attenuated moving pictures. The particular frequency band includes human sensitive frequency components. The picture temporal frequency attenuating device comprises a picture separator for separating the input analog moving picture signal into an input red analog moving picture signal, and an input green analog moving picture signal, and an input blue analog moving picture signal. Connected to the picture separator, a first analog-to-digital converter converts the input red analog moving picture signal into an input red digital moving picture signal. Connected to the picture separator, a second analog-to-digital converter converts the input green analog moving picture signal into an input green digital moving picture signal. Connected to the picture separator, a third analog-to-digital converter converts the input blue analog moving picture signal into an input blue digital moving picture signal. Connected to the first analog-to-digital converter, a first interlace distributor distributes the input red digital moving picture signal into an input odd-field red digital moving picture signal and an input even-field red digital moving picture signal. Connected to the second analog-to-digital converter, a second interlace distributor distributes the input green digital moving picture signal into an input odd-field green digital moving picture signal and an input even-field green digital moving picture signal. Connected to the third analog-to-digital converter, a third interlace distributor distributes the input blue digital moving picture signal into an input odd-field blue digital moving picture signal and an input even-field blue digital moving picture signal. Connected to the first interlace distributor, a first temporal filter carries out temporal filtering processing on the input odd-field red digital moving picture signal and on the input even-field red digital moving picture signal to attenuate the particular frequency band of the input odd-field red digital moving picture signal and of the input even-field red digital moving picture signal. The first temporal filter produces a temporally filtered odd-field red digital moving picture signal and a temporally filtered even-field red digital moving picture signal. Connected to the second interlace distributor, a second temporal filter carries out temporal filtering processing on the input odd-field green digital moving picture signal and on the input even-field green digital moving picture signal to attenuate the particular frequency band of the input odd-field green digital moving picture signal and of the input even-field green digital moving picture signal. The second temporal filter produces a temporally filtered odd-field green digital moving picture signal and a temporally filtered even-field green digital moving picture signal. Connected to the third interlace distributor, a third temporal filter carries out temporal filtering processing on the input odd-field blue digital moving picture signal and on the input even-field blue digital moving picture signal to attenuate the particular frequency band of the input odd-field blue digital moving picture signal and of the input even-field blue digital moving picture signal. The third temporal filter produces a temporally filtered odd-field blue digital moving picture signal and a temporally filtered even-field blue digital moving picture signal. Connected to the first temporal filter, a first interlace combiner temporally and alternately combines the temporally filtered odd-field red digital moving picture signal with the temporally filtered even-field red digital moving picture signal to produce a temporally filtered red digital moving picture signal. Connected to the second temporal filter, a second interlace combiner temporally and alternately combines the temporally filtered odd-field green digital moving picture signal with the temporally filtered even-field green digital moving picture signal to produce a temporally filtered green digital moving picture signal. Connected to the third temporal filter, a third interlace combiner temporally and alternately combines the temporally filtered odd-field blue digital moving picture signal with the temporally filtered even-field blue digital moving picture signal to produce a temporally filtered blue digital moving picture signal. Connected to the first interlace combiner, a first digital-to-analog converter converts the temporally filtered red digital moving picture signal into a temporally filtered red analog moving picture signal. Connected to the second interlace combiner, a second digital-to-analog converter converts the temporally filtered green digital moving picture signal into a temporally filtered green analog moving picture signal. Connected to the third interlace combiner, a third digital-to-analog converter converts the temporally filtered blue digital moving picture signal into a temporally filtered blue analog moving picture signal. Connected to the first through the third digital-to-analog converters, a picture combiner combines the temporally filtered red analog moving picture signal, the temporally filtered green analog moving picture signal, and the temporally filtered blue analog moving picture signal to produce the smoothly-changing analog moving picture signal.

According to the present invention, a picture temporal frequency attenuating device adaptively attenuates a particular temporal frequency band of an input moving picture signal indicative of input moving pictures supplied from a moving picture output device to produce a smoothly-changing moving picture signal indicative of adaptively frequency attenuated moving pictures. The particular temporal frequency band includes human sensitive frequency components. The picture temporal frequency attenuating device comprises a picture temporal frequency component measuring section for measuring magnitude of temporal changes in a luminance component of the input moving picture signal. The picture temporal frequency component measuring section produces an intermediate moving picture signal and a time constant signal corresponding to the magnitude of the temporal changes. Connected to the picture temporal frequency component measuring section, a picture temporal filtering section carries out, in response to the time constant signal, temporal filtering processing on the luminance component of the intermediate moving picture signal to adaptively attenuate the particular temporal frequency band of the intermediate moving picture signal. The picture temporal filtering section produces a temporally filtered moving picture signal as the smoothly-changing moving picture signal.

According to the present invention, a picture temporal frequency attenuating device adaptively attenuates a particular temporal frequency band of an input moving picture signal indicative of input moving pictures supplied from a moving picture output device to produce a smoothly-changing moving picture signal indicative of adaptively frequency attenuated moving pictures. The particular temporal frequency band includes human sensitive frequency components. The picture temporal frequency attenuating device comprises a picture temporal frequency component measuring section for measuring magnitude of temporal changes in RGB components of the input moving picture signal. The picture temporal frequency component measuring section produces an intermediate moving picture signal and a time constant signal corresponding to the magnitude of the temporal changes. Connected to the picture temporal frequency component measuring section, a picture temporal filtering section carries out, in response to the time constant signal, temporal filtering processing on the RGB components of the intermediate moving picture signal to adaptively attenuate the particular temporal frequency band of the intermediate moving picture signal. The picture temporal filtering section produces a temporally filtered moving picture signal as the smoothly-changing moving picture signal.

According to the present invention, a method adaptively attenuates a particular temporal frequency band of an input moving picture signal indicative of input moving pictures to produce a smoothly-changing moving picture signal indicative of adaptively frequency attenuated moving pictures. The particular temporal frequency band includes human sensitive frequency components. The method comprises the steps of: measuring magnitude of temporal changes in a luminance component of the input moving picture singal to produce an intermediate moving picture signal and a time constant signal corresponding to the magnitude of the temporal changes; and carrying out, in response to the time constant signal, temporal filtering processing on the luminance component of the intermediate moving picture signal to adaptively attenuate the particular temporal frequency band of the intermediate moving picture signal, thus producing a temporally filtered moving picture signal as the smoothly-changing moving picture signal.

According to the present invention, a method adaptively attenuates a particular temporal frequency band of an input moving picture signal indicative of input moving pictures to produce a smoothly-changing moving picture signal indicative of adaptively frequency attenuated moving pictures. The particular temporal frequency band includes human sensitive frequency components. The method comprises the steps of: measuring magnitude of temporal changes in RGB components of the input moving picture singal to produce an intermediate moving picture signal and a time constant signal corresponding to the magnitude of the temporal changes; and carrying out, in response to the time constant signal, temporal filtering processing on the RGB components of the intermediate moving picture signal to adaptively attenuate the particular temporal frequency band of the intermediate moving picture signal, thus producing a temporally filtered moving picture signal as the smoothly-changing moving picture signal.

DESCRIPTION OF THE PREFERRED EMBODIMENTS

Figure 1:
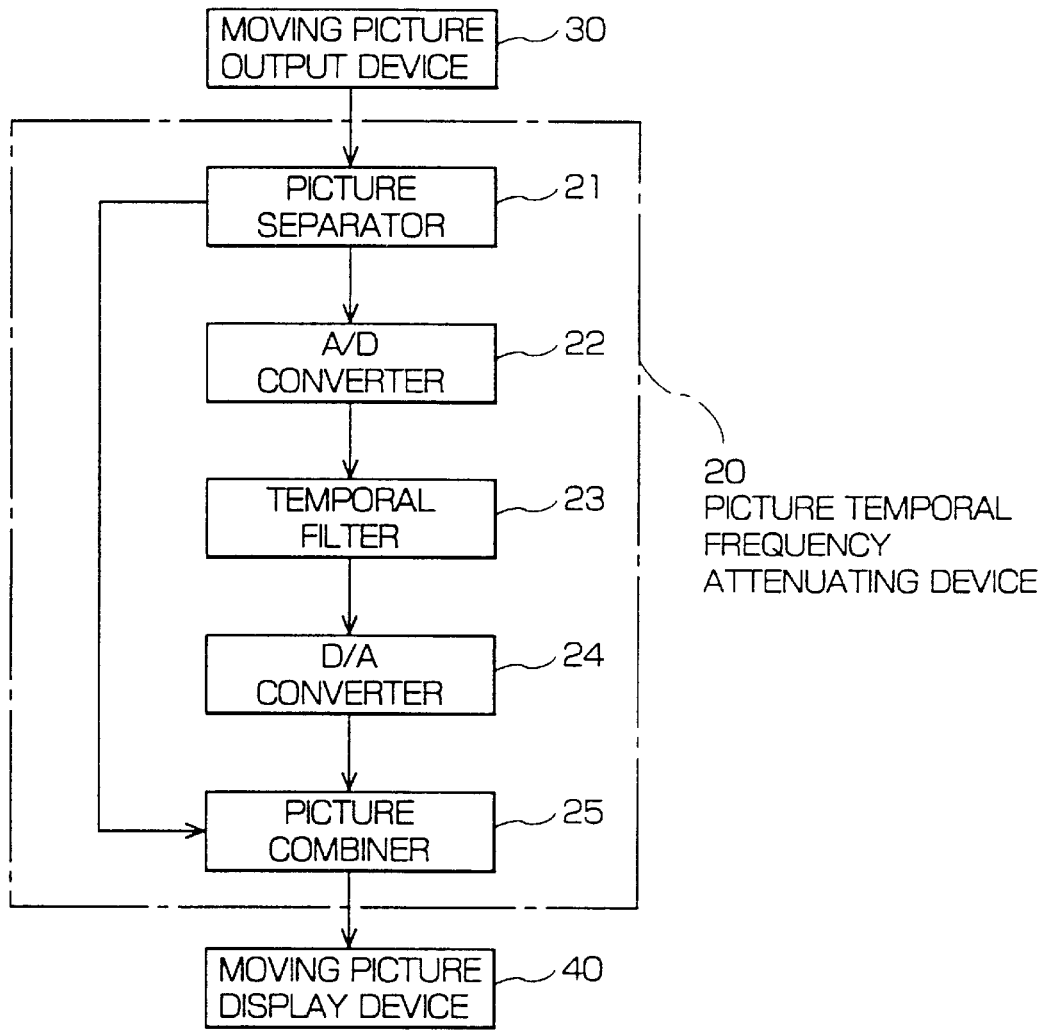
FIG. 1 is a block diagram of a picture temporal frequency attenuating device according to a first embodiment of this invention together with a moving picture output device and a moving picture display device.

Referring to FIG. 1, description will begin with a picture temporal frequency attenuating device 20 according to a first embodiment of this invention. The picture temporal frequency attenuating device 20 is connected between a moving picture output device 30 and a moving picture display device 40. Other devices such as a video tape recorder, a transmitter, or the like may be used instead of the moving picture display device 40. The picture temporal frequency attenuating device 20 is called a video display terminal (VDT) adapter. The illustrated moving picture output device 30 is non-interlaced scanning type.

The moving picture output device 30 produces an input analog moving picture signal indicative of input moving pictures. The input analog moving picture signal is supplied to the picture temporal frequency attenuating device 20. In the manner which will later become clear, the picture temporal frequency attenuating device 20 selectively attenuates a particular frequency band of the input analog moving picture signal to produce, as an output analog moving picture signal, a smoothly-moving analog moving picture signal indicative of selectively frequency attenuated moving pictures. The output analog moving picture signal is supplied with the moving picture display device 40. The moving picture display device 40 has a display screen (not shown) on which the output analog moving picture signal is displayed.

The picture temporal frequency attenuating device 20 comprises a picture separator 21, an analog-to-digital (A/D) converter 22, a temporal filter 23, a digital-to-analog (D/A) converter 24, and a picture combiner 25.

The picture separator 21 is connected to the moving picture output device 30. The picture separator 21 separates the input analog moving picture signal into an input analog luminance signal and input analog chromaticity signals. The input analog luminance signal is supplied to the A/D converter 22. The input analog chromaticity signals are supplied to the picture combiner 25.

The A/D converter 22 is connected to the picture separator. The A/D converter 22 converts the input analog luminance signal into an input digital luminance signal indicative of luminance values of the input analog moving picture signal. The input digital luminance signal is supplied to the temporal filter 23. A combination of the picture separator 21 and the A/D converter 22 serves as an inputting arrangement.

The temporal filter 23 is connected to the A/D converter 22. The temporal filter 23 carries out temporal filtering processing on the input digital luminance signal to attenuate the particular frequency band of the input digital luminance signal. The temporal filter 23 produces a temporally filtered digital luminance signal. The temporal filter 23 acts as a picture temporal frequency attenuator arrangement. The temporally filtered digital luminance signal is supplied to the D/A converter 24.

The D/A converter 24 is connected to the temporal filter 23. The D/A converter 24 converts the temporally filtered digital luminance signal into a temporally filtered analog luminance signal. The temporally filtered analog luminance signal is supplied to the picture combiner 25.

The picture combiner 25 is connected to the D/A converter 24. The picture combiner 25 combines the temporally filtered analog luminance signal with the input analog chromaticity signal to produce the smoothly-changing analog moving picture signal. The smoothly-changing analog moving picture signal is supplied to the moving picture display device 40 as the output analog moving picture signal. A combination of the D/A converter 24 and the picture combiner 25 is operable as an outputting arrangement.

Figure 2:
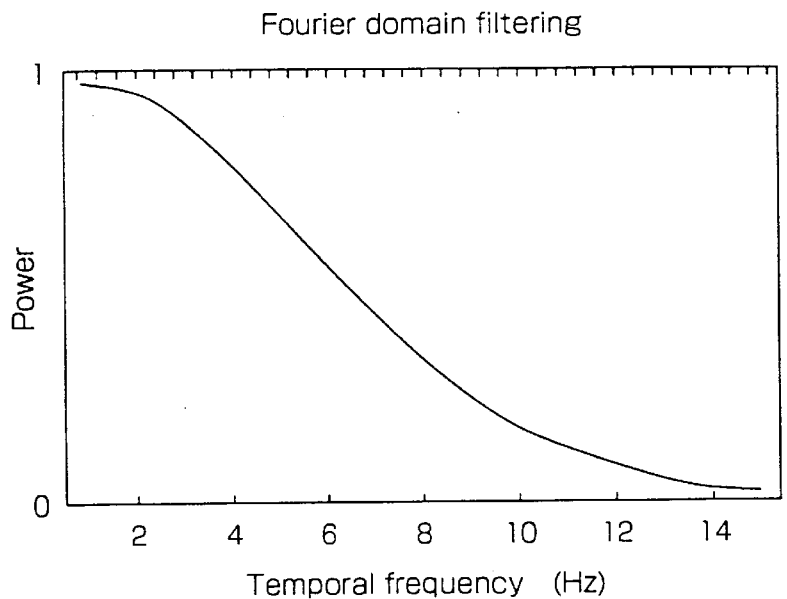
FIG. 2 shows an example of a filtering characteristic of a temporal filter in the picture temporal frequency attenuating device illustrated in FIG. 1.

FIG. 2 shows an example of a filtering characteristic of the temporal filter 23. In FIG. 2, the abscissa and the ordinate represent temporal frequency [Hz] and power of the ratio of the temporally filtered digital luminance signal to the input digital luminance signal, respectively. As apparent from FIG. 3, the temporal filter 23 has the filtering characteristic having a particular frequency band where the power attenuates sufficiently. In the example being illustrated, the particular frequency band lies on of a range not less than 7 Hz. The particular frequency band may lie on a range between 7 Hz and 60 Hz, both inclusive. Preferably, the particular frequency band may include human sensitive frequency of about 10 Hz, namely, lie on a range between 7 Hz and 15 Hz, both inclusive. With this structure, it is possible to protect a user of VDT against excessive stress disease.

The human sensitive frequency is, for example, obtained by checking a frequency where the human can confirm flicker with contrast decreased when black-and-white flicker is displayed on a screen of gray background with changing contrast of black-and-white and frequency.

Figure 3:
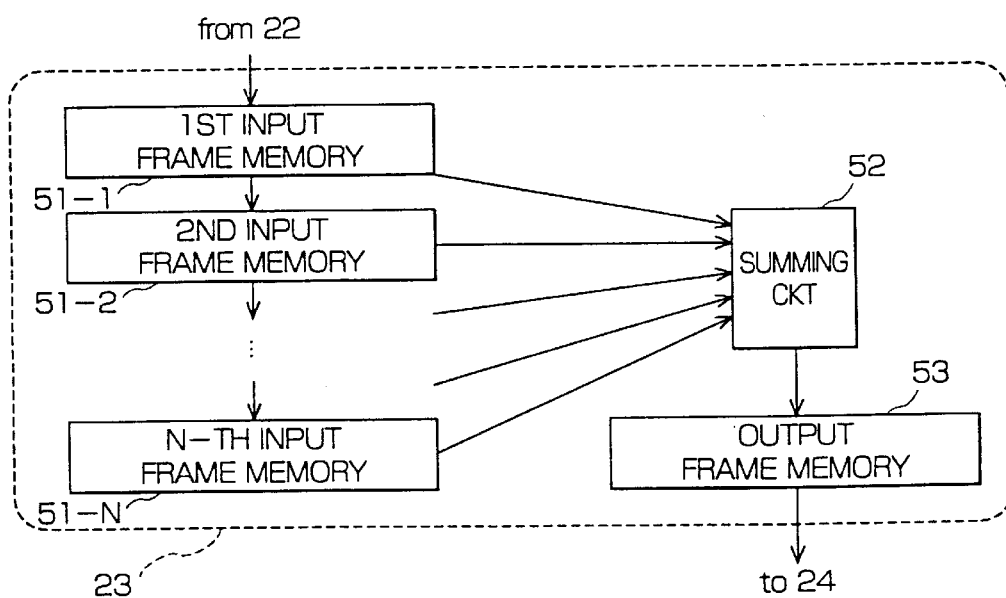
FIG. 3 is a block diagram of the temporal filter for use in the picture temporal frequency attenuating device illustrated in FIG. 1.

Turning to FIG. 3, the temporal filter 23 comprises first through N-th input frame memories 51-1, 51-2, . . . , and 51-N, where N represents a positive integer which is not less than two, a summing circuit 52, and an output frame memory 53.

The first input frame memory 51-1 is connected to the A/D converter 22. The first through the N-th input frame memories 51-1 to 51-N are connected to each other in cascade in this order. The first input frame memory 51-1 stores, as a first stored luminance frame, the input digital luminance signal frame by frame. The first stored luminance frame is supplied to the second input frame memory 51-2. The second input frame memory 52-1 stores the first stored luminance frame as a second stored luminance frame. In general, an n-th input frame memory 51-n stores an (n–1)-th stored luminance frame as an n-th stored luminance frame, where n represents a variable between 2 through N, both inclusive. Thus, there is a time delay for one frame between the (n–1)-th stored luminance frame and the n-th stored luminance frame. The first through N-th stored luminance frames are supplied to the summing circuit 52.

The summing circuit 52 has first through N-th frame weighting factors W-1, W-2, . . . , and W-N for the first through the N-th input frame memories 51-1 to 51-N, respectively. The summing circuit 52 calculates an N term sum of the luminance values of the first through the N-th stored luminance frames weighted by the first through the N-th frame weighting factors W-1 to W-N pixel by pixel to produce a summed luminance frame indicative of an N term sum result. The summed luminance frame is supplied to the output frame memory 53. The output frame memory 53 stores the summed luminance frame as an output luminance frame. The output frame memory 53 produces the output luminance frame as the temporally filtered digital luminance signal.

The illustrated temporal filter 23 stores a plurality of past frames to carry out temporal filtering on the input digital luminance signal by using the past frames.

Figure 4:
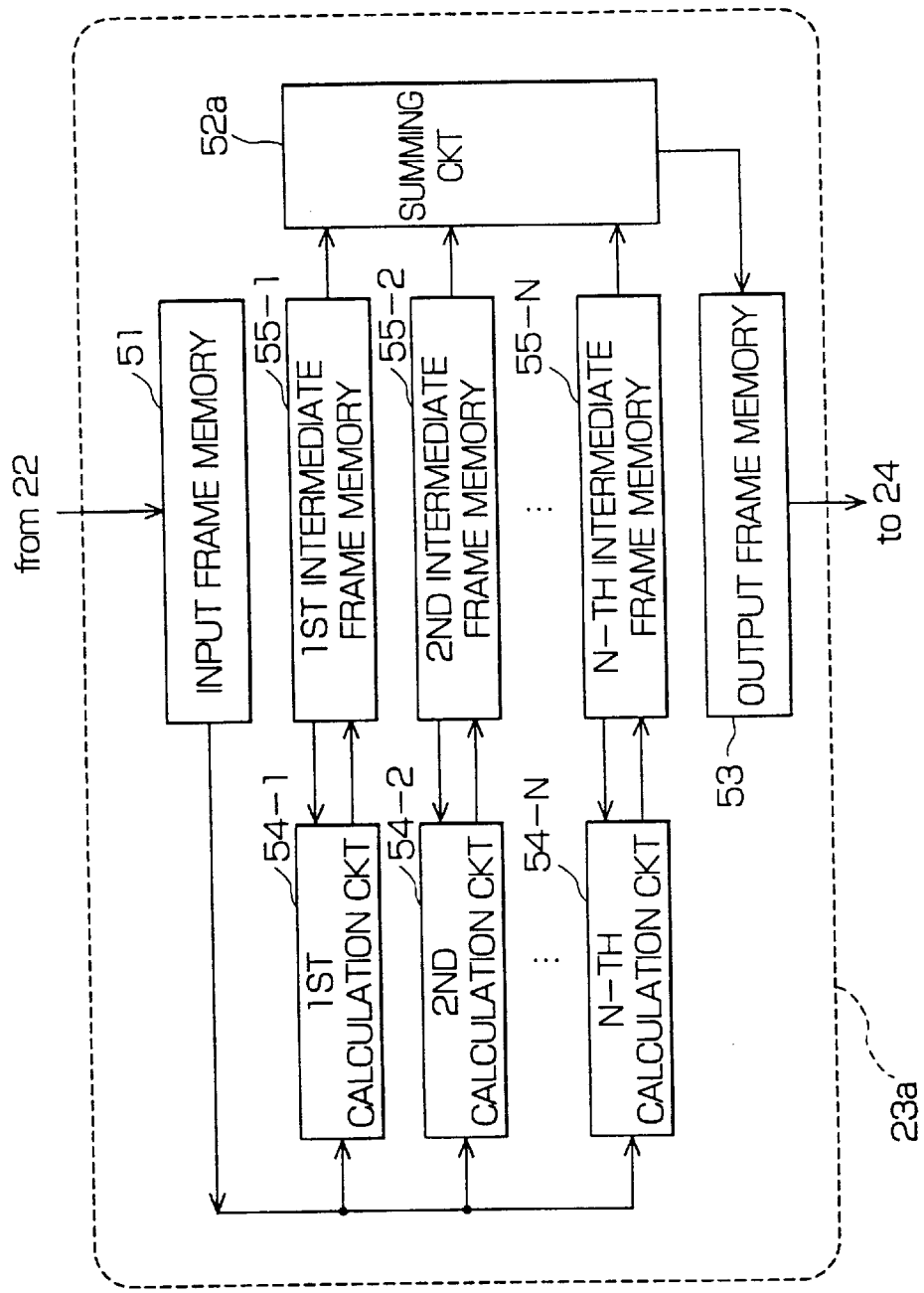
FIG. 4 is a block diagram of another temporal filter for use in the picture temporal frequency attenuating device illustrated in FIG. 1.

Turning to FIG. 4, another temporal filter 23a comprises an input frame memory 51, first through N-th calculation circuits 54-1, 54-2, . . . , 54-N, where N represents a positive integer which is not less than two, first through N-th intermediate frame memories 55-1, 55-2, . . . , 55-N, a summing circuit 52a, and the output frame memory 53.

The input frame memory 51 is connected to the A/D converter 22. The input frame memory 51 stores, as an input stored luminance frame, the input digital luminance signal frame by frame. The input stored luminance frame is supplied to the first through the N-th calculation circuits 54-1 to 54-N. The first through the N-th calculation circuits 54-1 to 54-N are connected to the first through the N-th intermediate frame memories 55-1 to 55-N, respectively. An n-th intermediate frame memory 55-n stores, as an n-th stored intermediate luminance frame, an frame previously inputted to the input stored luminance frame by one frame, where n represents a variable between 1 through N, both inclusive. An n-th calculation circuit 54-n calculates the average of the input stored luminance frame and the n-th stored intermediate luminance frame to produce an n-th mean intermediate luminance frame. The n-th mean intermediate luminance frame is stored in the n-th intermediate frame memory 55-n as an n-th refreshed stored intermediate luminance frame. The first through the N-th stored intermediate luminance frames are supplied to the summing circuit 52a. The summing circuit 52a calculates an N term sum of the luminance values of the first through the N-th stored intermediate luminance frames pixel by pixel to produce a summed luminance frame indicative of an N term sum result. The summed luminance frame is supplied to the output frame memory 53. The output frame memory 53 stores the summed luminance frame as an output luminance frame. The output frame memory 53 produces the output luminance frame as the temporally filtered digital luminance signal.

In the illustrated temporal filter 23a, a combination of the n-th intermediate frame memory 55-n and the n-th calculation circuit 54-n serves as an n-th low-pass filter. The first and the N-th low-pass filters carry out different low-pass filtering operations in parallel. That is, the temporal filter 23a is implemented by approximating as the average of outputs of a plurality of low-pass filters having different time constants.

Figure 5:
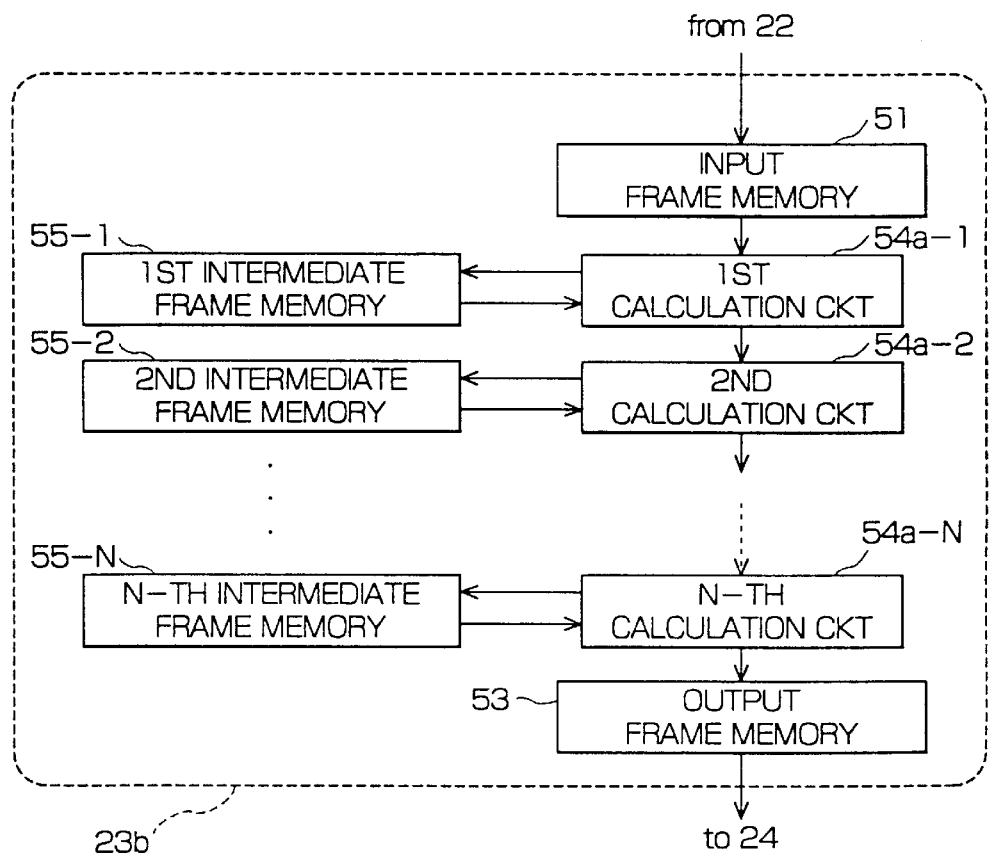
FIG. 5 is a block diagram of still another temporal filter for use in the picture temporal frequency attenuating device illustrated in FIG. 1.

Turning to FIG. 5, still another temporal filter 23b comprises the input frame memory 51, first through N-th calculation circuits 54a-1, 54a-2, ..., 54a-N, where N represents a positive integer which is not less than one, the first through the N-th intermediate frame memories 55-1, 55-2, ..., 55-N, and the output frame memory 53.

The input frame memory 51 is connected to the A/D converter 22. The input frame memory 51 stores, as an input stored luminance frame, the input digital luminance signal frame by frame. The input stored luminance frame is supplied to the first calculation circuit 54a-1. The first through the N-th calculation circuits 54a-1 to 54a-N are connected to each other in cascade. The first through the N-th calculation circuits 54a-1 to 54a-N are connected to the first through the N-th intermediate frame memories 55-1 to 55-N, respectively. The N-th calculation circuit 54a-N is connected to the output frame memory 53.

It is assumed that the input stored luminance frame stored in the input frame memory 51 is represented by current picture luminance data $I_{x,y}(t)$ on coordinate (x, y) at a current time instant t. In addition, the first through the N-th intermediate frame memories 55-1 to 55-N store first through N-th stored intermediate luminance frames which are represented by first through N-th filtered picture luminance data $A(1)_{x,y}(t-1)$, $A(2)_{x,y}(t-1)$, ..., $A(N)_{x,y}(t-1)$ at a previous time instant (t-1), respectively. Under the circumstance, the first calculation circuit 54a-1 calculates first new filtered picture luminance data $A(1)_{x,y}(t)$ by using the current picture luminance data $I_{x,y}(t)$ and the first filtered picture luminance data $A(1)_{x,y}(t-1)$ in accordance with Equation (1) which is represented by:

$$A(1)_{x,y}(t)=\tau_1 A(1)_{x,y}(t-1)+(1-\tau_1)I_{x,y}(t), \qquad (1)$$

where $\tau_1$ represents a first positive parameter less than one. The first calculation circuit 54a-1 supplies the first intermediate frame memory 55-1 and the second calculation circuit 54a-2 with a first calculated intermediate luminance frame indicative of the first new filtered picture luminance data $A(1)_{x,y}(t)$. The second calculation circuit 54a-2 calculates second new filtered picture luminance data $A(2)_{x,y}(t)$ by using the second filtered picture luminance data $A(2)_{x,y}(t-1)$ and the first filtered picture luminance data $A(1)_{x,y}(t)$ in accordance with Equation (2) which is represented by:

$$A(2)_{x,y}(t)=\tau_2 A(2)_{x,y}(t-1)+(1-\tau_2)A(1)_{x,y}(t). \qquad (2)$$

In general, an n-th calculation circuit 54a-n calculates n-th new filtered picture luminance data $A(n)_{x,y}(t)$ by using n-th filtered picture luminance data $A(n)_{x,y}(t-1)$ and (n-1)-th filtered picture luminance data $A(n-1)_{x,y}(t)$ in accordance with Equation (3) which is represented by:

$$A(n)_{x,y}(t)=\tau_n A(n)_{x,y}(t-1)+(1-\tau_n)A(n-1)_{x,y}(t), \qquad (3)$$

where n represents a variable between 2 and n, both inclusive, $\tau_n$ represents an n-th positive parameter which is less than one and which determines strength of effect for frequency filter. Thus, the N-th calculation circuit 54a-N supplies the output frame memory 53 with an N-th calculated intermediate luminance frame indicative of the N-th filtered picture luminance data $A(n)_{x,y}(t)$. The output frame memory 53 stores the N-th calculated intermediate luminance frame as an output luminance frame. The output frame memory 53 produces the output luminance frame as the temporally filtered digital luminance signal.

In the illustrated temporal filter 23b, in order to control of the strength of effect thereof, the n-th positive parameter $\tau_n$ is set in a suitable value on use. In addition, the temporal filter 23b comprises the low-pass filters of N stages. The stage number N is another parameter for controlling temporal smoothness for the output analog moving picture signal and is selected out of one to ten. That is, the temporal filter 23b is implemented by one or more low-pass filters which are connected to each other in series.

Figure 6:
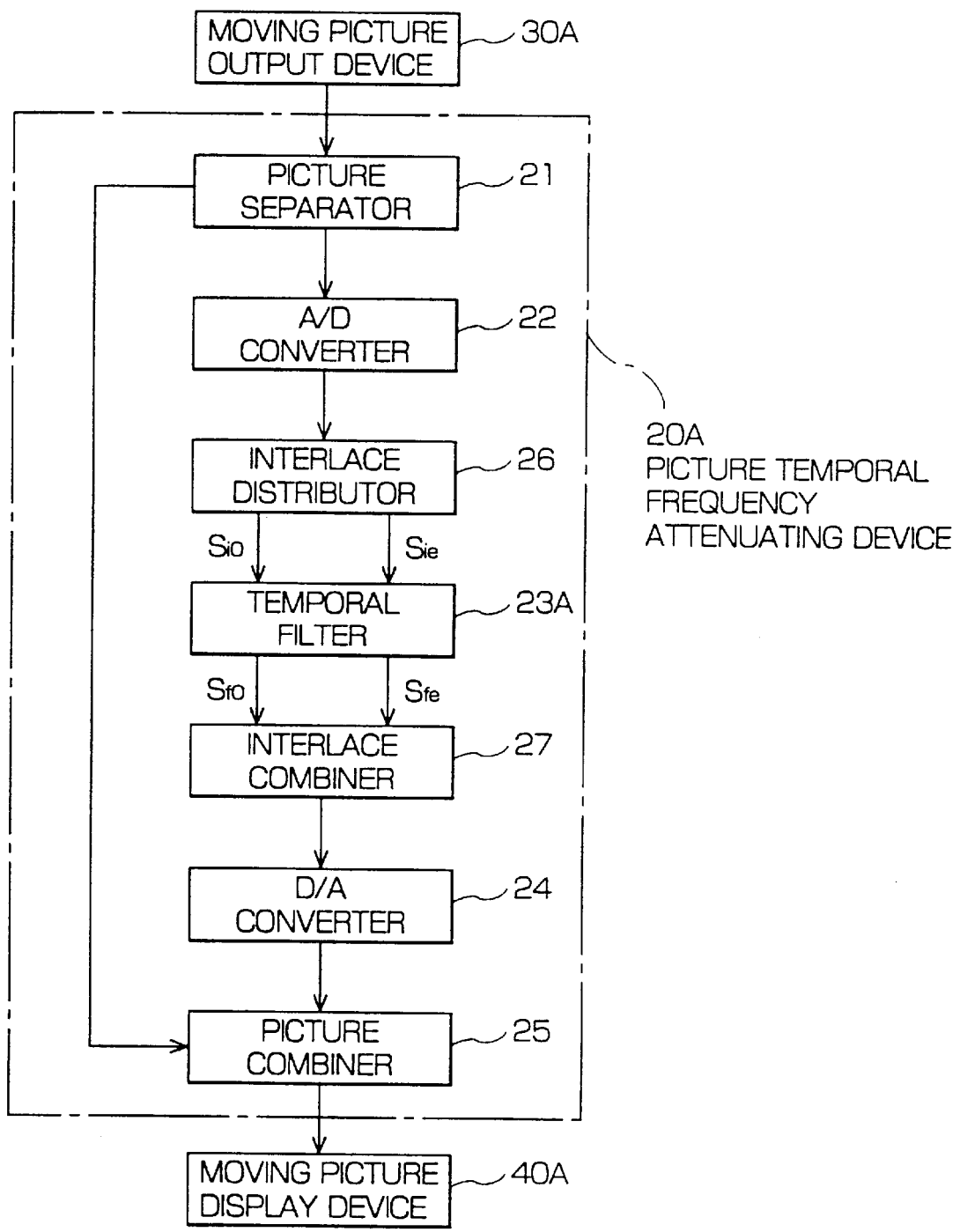
FIG. 6 is a block diagram of a picture temporal frequency attenuating device according to a second embodiment of this invention together with a moving picture output device and a moving picture display device.

Referring to FIG. 6, description will begin with a picture temporal frequency attenuating device 20A according to a second embodiment of this invention. The picture temporal frequency attenuating device 20A is connected between a moving picture output device 30A and a moving picture display device 40A. The illustrated moving picture output device 30A is interlaced scanning type.

The moving picture output device 30A produces an input analog moving picture signal indicative of input moving pictures. The input analog moving picture signal is supplied to the picture temporal frequency attenuating device 20A. In the manner which will later become clear, the picture temporal frequency attenuating device 20A selectively attenuates a particular frequency band of the input analog moving picture signal to produce, as an output analog moving picture signal, a smoothly-changing analog moving picture signal indicative of selectively frequency attenuated moving pictures. The output analog moving picture signal is supplied with the moving picture display device 40A. The moving picture display device 40A has a display screen (not shown) on which the output analog moving picture signal is displayed.

The picture temporal frequency attenuating device 20A comprises the picture separator 21, the analog-to-digital (A/D) converter 22, an interlace distributor 26, a temporal filter 23A, an interlace combiner 27, the digital-to-analog (D/A) converter 24, and the picture combiner 25.

The picture separator 21 is connected to the moving picture output device 30. The picture separator 21 separates the input analog moving picture signal into an input analog luminance signal and input analog chromaticity signals. The input analog luminance signal is supplied to the A/D converter 22. The input analog chromaticity signals are supplied to the picture combiner 25.

The A/D converter 22 is connected to the picture separator. The A/D converter 22 converts the input analog luminance signal into an input digital luminance signal indicative of luminance values of the input analog moving picture signal. The input digital luminance signal is supplied to the interlace distributor 26.

As well known in the art, each frame is divided into two fields, namely, an odd field and an even field. The interlace distributor 26 is connected to the A/D converter 22. The interlace distributor 26 distributes the input digital luminance signal into an input odd-field digital luminance signal $S_{io}$ and an input even-field digital luminance signal $S_{ie}$. The input odd-field digital luminance signal $S_{io}$ and the input even-field digital luminance signal $S_{ie}$ are supplied to the temporal filter 23A.

The temporal filter 23A is connected to the interlace distributor 26. The temporal filter 23A carries out temporal filtering processing on the input odd-field digital luminance signal $S_{io}$ and on the input even-field digital luminance signal $S_{ie}$ to attenuate the particular frequency band of the input odd-field digital luminance signal $S_{io}$ and of input even-field digital luminance signal $S_{ie}$. The temporal filter 23A produces a temporally filtered odd-field digital luminance signal $S_{fo}$ and a temporally filtered even-field digital luminance signal $S_{fe}$. The temporally filtered odd-field digital luminance signal $S_{fo}$ and the temporally filtered even-field digital luminance signal $S_{fe}$ are supplied to the interlace combiner 27.

The interlace combiner 27 is connected to the temporal filter 23A. The interlace combiner 27 temporally and alternately combines the temporally filtered odd-field digital luminance signal with the temporally filtered even-field digital luminance signal to produce a temporally filtered digital luminance signal. The temporally filtered digital luminance signal is supplied to the D/A converter 24.

The D/A converter 24 is connected to the interlace combiner 27. The D/A converter 24 converts the temporally filtered digital luminance signal into a temporally filtered analog luminance signal. The temporally filtered analog luminance signal is supplied to the picture combiner 25.

The picture combiner 25 is connected to the D/A converter 24. The picture combiner 25 combines the temporally filtered analog luminance signal with the input analog chromaticity signal to produce the smoothly-changing analog moving picture signal. The smoothly-changing analog moving picture signal is supplied to the moving picture display device 40A as the output analog moving picture signal.

Figure 7:
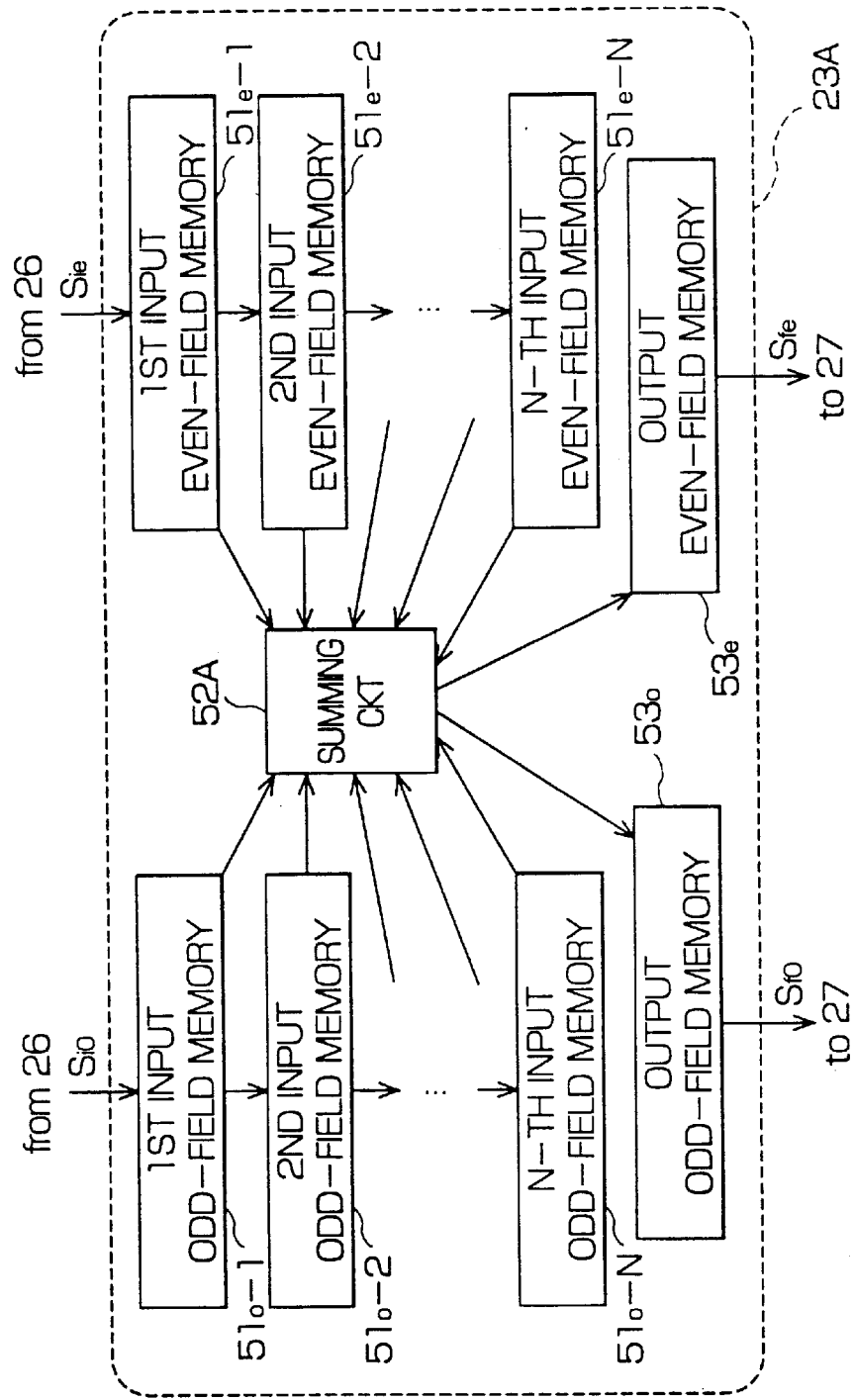
FIG. 7 is a block diagram of a temporal filter for use in the picture temporal frequency attenuating device illustrated in FIG. 6.

Turning to FIG. 7, the temporal filter 23A comprises first through N-th input odd-field memories $51_o$-1, $51_o$-2, ... and $51_o$-N, where N represents a positive integer which is not less than two, first through N-th input even-field memories $51_e$-1, $51_e$-2, ..., and $51_e$-N, a summing circuit 52A, an output odd-field memory $53_o$, and an output even-field memory $53_e$.

The first input odd-field memory $51_o$-1 is connected to the interlace distributor 26. The first through the N-th input odd-field memories $51_o$-1 to $51_o$-N are connected to each other in cascade in this order. The first input odd-field memory $51_o$-1 stores, as a first stored luminance odd field, the input odd-field digital luminance signal odd field by odd field. The first stored luminance odd field is supplied to the second input odd-field memory $51_o$-2. The second input odd-field memory $52_o$-1 stores the first stored luminance odd field as a second stored luminance odd field. In general, an n-th input odd-field memory $51_o$-n stores an (n-1)-th stored luminance odd field as an n-th stored luminance odd field, where n represents a variable between 2 and N, both inclusive. Thus, there is a time delay for one frame between the (n-1)-th stored luminance odd field and the n-th stored luminance odd field. The first through N-th stored luminance odd fields are supplied to the summing circuit 52A.

Likewise, the first input even-field memory $51_e$-1 is connected to the the interlace distributor 26. The first through the N-th input even-field memories $51_e$-1 to $51_e$-N are connected to each other in cascade in this order. The first input even-field memory $51_e$-1 stores, as a first stored luminance even field, the input even-field digital luminance signal even field by even field. The first stored luminance even field is supplied to the second input even-field memory $51_e$-2. The second input even-field memory $52_e$-1 stores the first stored luminance even field as a second stored luminance even field. In general, an n-th input even-field memory $51_e$-n stores an (n-1)-th stored luminance even field as an n-th stored luminance even field. Thus, there is a time delay for one frame between the (n-1)-th stored luminance even field and the n-th stored luminance even field. The first through N-th stored luminance even fields are supplied to the summing circuit 52A.

The summing circuit 52A has first through N-th odd-field weighting factors $W_o$-1, $W_o$-2, ..., and $W_o$-N for the first through the N-th input odd-field memories $51_o$-1 to $51_o$-N, respectively. The summing circuit 52A calculates an N term odd sum of the luminance values of the first through the N-th stored luminance odd fields weighted by the first through the N-th odd-field weighting factors $W_o$-1 to $W_o$-N pixel by pixel to produce a summed luminance odd field indicative of an N term odd sum result. The summed luminance odd field is supplied to the output odd-field memory $53_o$. The output odd-field memory $53_o$ stores the summed luminance odd field as an output luminance odd field. The output odd-field memory $53_o$ produces the output luminance odd field as the temporally filtered odd-field digital luminance signal.

In addition, the summing circuit 52A has first through N-th even-field weighting factors $W_e$-1, $W_e$-2, ..., and $W_e$-N for the first through the N-th input even-field memories $51_e$-1 to $51_e$-N, respectively. The summing circuit 52A calculates an N term even sum of the luminance values of the first through the N-th stored luminance even fields weighted by the first through the N-th even-field weighting factors $W_e$-1 to $W_e$-N pixel by pixel to produce a summed luminance even field indicative of an N term even sum result. The summed luminance even field is supplied to the output even-field memory $53_e$. The output even-field memory $53_e$ stores the summed luminance even field as an output luminance even field. The output even-field memory $53_e$ produces the output luminance even-field as the temporally filtered even-field digital luminance signal.

In the example being illustrate, the summing circuit 52A successively and alternatively carries out processing on odd fields and processing on even fields. The picture temporal frequency attenuating device 20A may comprise an odd summing circuit and an even summing circuit in place of the summing circuit 52A. In this event, the odd summing circuit and the even summing circuit carry out, in parallel, the processing on odd fields and the processing on even fields, respectively.

Figure 8:
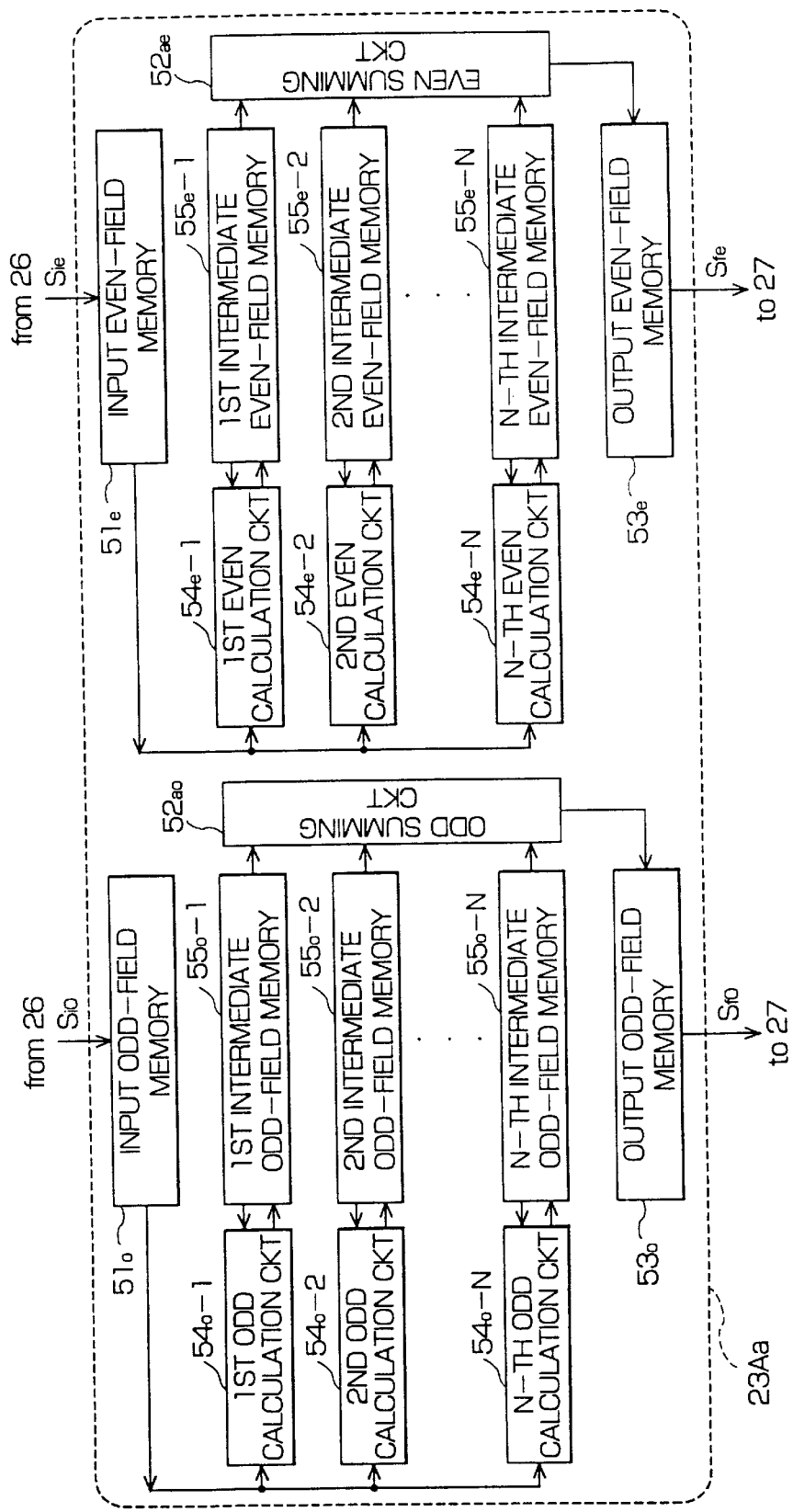
FIG. 8 is a block diagram of another temporal filter for use in the picture temporal frequency attenuating device illustrated in FIG. 6.

Turning to FIG. 8, another temporal filter 23Aa comprises an input odd-field memory $51_o$, first through N-th odd calculation circuits $54_o$-1, $54_o$-2, ..., $54_o$-N, first through N-th intermediate odd-field memories $55_o$-1, $55_o$-2, ..., $55_o$-N, an odd summing circuit $52a_o$, an output odd-field memory $53_o$, an input even-field memory $51_e$, first through N-th even calculation circuits $54_e$-1, $54_e$-2, ..., $54_e$-N, first through N-th intermediate even-field memories $55_e$-1, $55_e$-2, ..., $55_e$-N, an even summing circuit $52a_e$, and an output even-field memory $53_e$.

The input odd-field memory $51_o$ is connected to the interlace distributor 26. The input off-field memory $51_o$ stores, as an input stored luminance odd field, the input odd-field digital luminance signal odd field by odd field. The input stored luminance odd field is supplied to the first through the N-th odd calculation circuits $54_o$-1 to $54_o$-N. The first through the N-th odd calculation circuits $54_o$-1 to $54_o$-N are connected to the first through the N-th intermediate odd-field memories $55_o$-1 to $55_o$-N, respectively. An n-th intermediate odd-field memory $55_o$-n stores, as an n-th stored intermediate luminance odd field, an odd field previously inputted to the input stored luminance odd field by one frame, where n represents a variable between 1 through N, both inclusive.

An n-th odd calculation circuit $54_o$-n calculates the average of the input stored luminance odd field and the n-th stored intermediate luminance odd field to produce an n-th mean intermediate luminance odd field. The n-th mean intermediate luminance odd field is stored in the n-th intermediate odd-field memory $55_o$-n as an n-th refreshed stored intermediate luminance odd field. The first through the N-th stored intermediate luminance odd fields are supplied to the odd summing circuit $52a_o$. The odd summing circuit $52a_o$ calculates an N term odd sum of the luminance values of the first through the N-th stored intermediate luminance odd fields pixel by pixel to produce a summed luminance odd field indicative of an N term odd sum result. The summed luminance odd field is supplied to the output odd-field memory $53_o$. The output odd-field memory $53_o$ stores the summed luminance odd field as an output luminance odd field. The output odd-field memory $53_o$ produces the output luminance odd field as the temporally filtered odd-field digital luminance signal.

Similarly, the input even-field memory $51_e$ is connected to the interlace distributor 26. The input even-field memory $51_e$ stores, as an input stored luminance even field, the input even-field digital luminance signal even field by even field. The input stored luminance even field is supplied to the first through the N-th even calculation circuits $54_e$-1 to $54_e$-N. The first through the N-th even calculation circuits $54_e$-1 to $54_e$-N are connected to the first through the N-th intermediate even-field memories $55_e$-1 to $55_e$-N, respectively. An n-th intermediate even-field memory $55_e$-n stores, as an n-th stored intermediate luminance even field, an even field previously inputted to the input stored luminance even field by one frame.

An n-th even calculation circuit $54_e$-n calculates the average of the input stored luminance even field and the n-th stored intermediate luminance even field to produce an n-th mean intermediate luminance even field. The n-th mean intermediate luminance even field is stored in the n-th intermediate even-field memory $55_e$-n as a refreshed n-th stored intermediate luminance even field. The first through the N-th stored intermediate luminance even fields are supplied to the even summing circuit $52a_e$. The even summing circuit $52a_e$ calculates an N term even sum of the luminance values of the first through the N-th intermediate luminance even fields pixel by pixel to produce a summed luminance even field indicative of an N term even sum result. The summed luminance even field is supplied to the output even-field memory $53_e$. The output even-field memory $53_e$ stores the summed luminance even field as an output luminance even field. The output even-field memory $53_e$ produces the output luminance even field as the temporally filtered even-field digital luminance signal.

Figure 9:
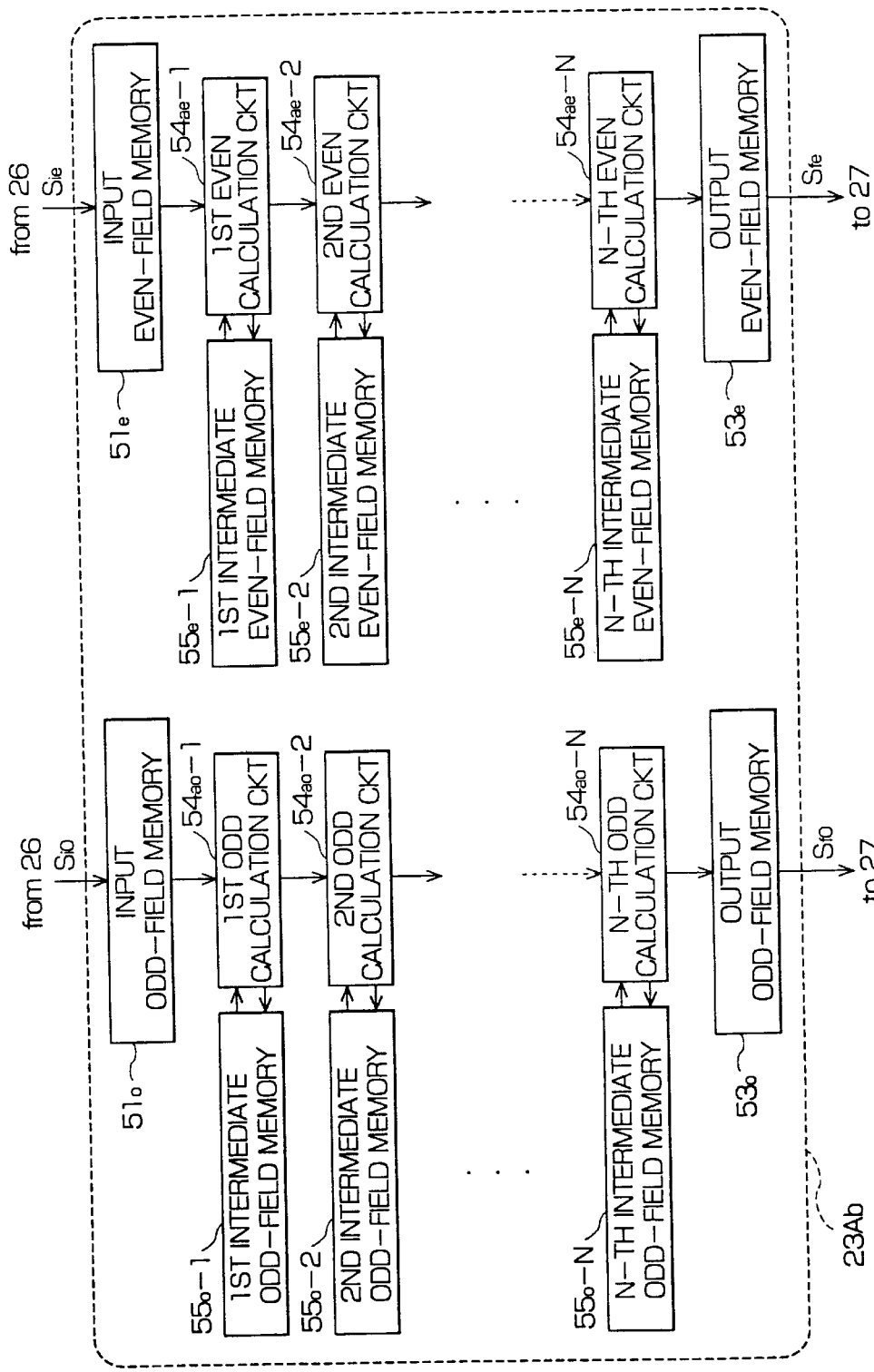
FIG. 9 is a block diagram of still another temporal filter for use in the picture temporal frequency attenuating device illustrated in FIG. 6.

Turning to FIG. 9, still another temporal filter 23Ab comprises the input odd-field memory $51_o$, first through N-th odd calculation circuits $54a_o$-1, $54a_o$-2, ..., $54a_o$-N, the first through the N-th intermediate odd-field memories $55_o$-1, $55_o$-2, ..., $55_o$-N, the output odd-field memory $53_o$, the input even-field memory $51_e$, first through N-th even calculation circuits $54a_e$-1, $54a_e$-2, ..., $54a_e$-N, the first through the N-th intermediate even-field memories $55_e$-1, $55_e$-2, ..., $55_e$-N, and the output even-field memory $53_e$.

The input odd-field memory $51_o$ is connected to the interlace distributor 26. The input odd-field memory $51_o$ stores, as an input stored luminance odd field, the input odd-field digital luminance signal odd field by odd field. The input stored luminance odd field is supplied to the first odd calculation circuit $54a_o$-1. The first through the N-th odd calculation circuits $54a_o$-1 to $54a_o$-N are connected to each other in cascade. The first through the N-th odd calculation circuits $54a_o$-1 to $54a_o$-N are connected to the first through the N-th intermediate odd-field memories $55_o$-1 to $55_o$-N, respectively. The N-th odd calculation circuit $54a_o$-N is connected to the output odd-field memory $53_o$.

Likewise, the input even-field memory $51_e$ is connected to the interlace distributor 26. The input even-field memory $51_e$ stores, as an input stored luminance even field, the input even-field digital luminance signal even field by even field. The input stored luminance even field is supplied to the first even calculation circuit $54a_e$-1. The first through the N-th even calculation circuits $54a_e$-1 to $54a_e$-N are connected to each other in cascade. The first through the N-th even calculation circuits $54a_e$-1 to $54a_e$-N are connected to the first through the N-th intermediate even-field memories $55_e$-1 to $55_e$-N, respectively. The N-th even calculation circuit $54a_e$-N is connected to the output even-field memory $53_e$.

It is assumed that the input stored luminance odd field stored in the input odd-field memory $51_o$ is represented by current odd-field luminance data $Io_{x,y}(t)$ on coordinate (x, y) at a current time instant t. In addition, the first through the N-th intermediate odd-field memories $55_o$-1 to $55_o$-N store first through N-th stored intermediate luminance odd fields which are represented by first through N-th filtered odd-field luminance data $Ao(1)_{x,y}(t-1)$, $Ao(2)_{x,y}(t-1)$, ..., $Ao(N)_{x,y}(t-1)$ at a previous time instant (t–1), respectively. Under the circumstance, the first odd calculation circuit $54a$-$1_o$ calculates new first filtered odd-field luminance data $Ao(1)_{x,y}(t)$ by using the current odd-field luminance data $Io_{x,y}(t)$ and the first filtered odd-field luminance data $Ao(1)_{x,y}(t-1)$ in accordance with Equation (4) which is represented by:

$$Ao(1)_{x,y}(t)=\tau_1 Ao(1)_{x,y}(t-1)+(1-\tau_1)Io_{x,y}(t), \qquad (4)$$

where $\tau_1$ represents a first positive parameter less than one. The first odd calculation circuit $54a_o$-1 supplies the first intermediate odd-field memory $55_o$-1 and the second odd calculation circuit $54a_o$-2 with a first calculated intermediate luminance odd field indicative of the first filtered odd-field luminance data $Ao(1)_{x,y}(t)$. The second odd calculation circuit $54a_o$-2 calculates new second filtered odd-field luminance data $Ao(2)_{x,y}(t)$ by using the second filtered odd-field luminance data $Ao(2)_{x,y}(t-1)$ and the first filtered odd-field luminance data $Ao(1)_{x,y}(t)$ in accordance with Equation (2) which is represented by:

$$Ao(2)_{x,y}(t)=\tau_2 Ao(2)_{x,y}(t-1)+(1-\tau_2)Ao(1)_{x,y}(t). \qquad (5)$$

In general, an n-th odd calculation circuit $54_o a$-n calculates new n-th filtered odd-field luminance data $Ao(n)_{x,y}(t)$ by using n-th filtered odd-field luminance data $Ao(n)_{x,y}(t-1)$ and (n–1)-th filtered odd-field luminance data $Ao(n-1)_{x,y}(t)$ in accordance with Equation (6) which is represented by:

$$Ao(n)_{x,y}(t)=\tau_n Ao(n)_{x,y}(t-1)+(1-\tau_n)Ao(n-1)_{x,y}(t), \qquad (6)$$

where $\tau_n$ represents an n-th positive parameter which is less than one and which determines strength of effect for frequency filter. Thus, the N-th odd calculation circuit $54a_o$-N supplies the output odd-field memory $53_o$ with an N-th calculated intermediate luminance odd field indicative of the N-th filtered odd-field luminance data $Ao(n)_{x,y}(t)$. The output odd-field memory $53_o$ stores the N-th calculated intermediate luminance odd field as an output luminance odd field. The output odd-field memory $53_o$ produces the output luminance odd-field as the temporally filtered odd-field digital luminance signal.

Similarly, it is presumed that the input stored luminance even field stored in the input even-field memory $51_e$ is represented by current even-field luminance data $Ie_{x,y}(t)$ on coordinate (x, y) at the current time instant t. In addition, the first through the N-th intermediate even-field memories $55_e$-1 to $55_e$-N store first through N-th stored intermediate luminance even fields which are represented by first through N-th filtered even-field luminance data $Ae(1)_{x,y}(t-1)$, $Ae(2)_{x,y}(t-1)$, ..., $Ae(N)_{x,y}(t-1)$ at the previous time instant (t−1), respectively. Under the circumstance, the first even calculation circuit $54a_e$-1 calculates new first filtered even-field luminance data $Ae(1)_{x,y}(t)$ by using the current even-field luminance data $Ie_{x,y}(t)$ and the first filtered even-field luminance data $Ae(1)_{x,y}(t-1)$ in accordance with Equation (7) which is represented by:

$$Ae(1)_{x,y}(t) = \tau_1 Ae(1)_{x,y}(t-1) + (1-\tau_1)Ie_{x,y}(t). \tag{7}$$

The first even calculation circuit $54a_e$-1 supplies the first intermediate even-field memory $55_e$-1 and the second even calculation circuit $54a_e$-2 with a first calculated intermediate luminance even field indicative of the first filtered even-field luminance data $Ae(1)_{x,y}(t)$. The second even calculation circuit $54a_e$-2 calculates new second filtered even-field luminance data $Ae(2)_{x,y}(t)$ by using the second filtered even-field luminance data $Ae(2)_{x,y}(t-1)$ and the first filtered even-field luminance data $Ae(1)_{x,y}(t)$ in accordance with Equation (8) which is represented by:

$$Ae(2)_{x,y}(t) = \tau_2 Ae(2)_{x,y}(t-1) + (1-\tau_2)Ae(1)_{x,y}(t). \tag{8}$$

In general, an n-th even calculation circuit $54a_e$-n calculates new n-th filtered even-field luminance data $Ae(n)_{x,y}(t)$ by using n-th filtered even-field luminance data $Ae(n)_{x,y}(t-1)$ and (n−1)-th filtered even-field luminance data $Ae(n-1)_{x,y}(t)$ in accordance with Equation (9) which is represented by:

$$Ae(n)_{x,y}(t) = \tau_n Ae(n)_{x,y}(t-1) + (1-\tau_n)Ae(n-1)_{x,y}(t). \tag{9}$$

Thus, the N-th even calculation circuit $54a_e$-N supplies the output even-field memory $53_e$ with an N-th calculated intermediate luminance even field indicative of the N-th filtered even-field luminance data $Ae(n)_{x,y}(t)$. The output even-field memory $53_e$ stores the N-th calculated intermediate luminance even field as an output luminance even field. The output even-field memory $53_e$ produces the output luminance even-field as the temporally filtered even-field digital luminance signal.

Figure 10:
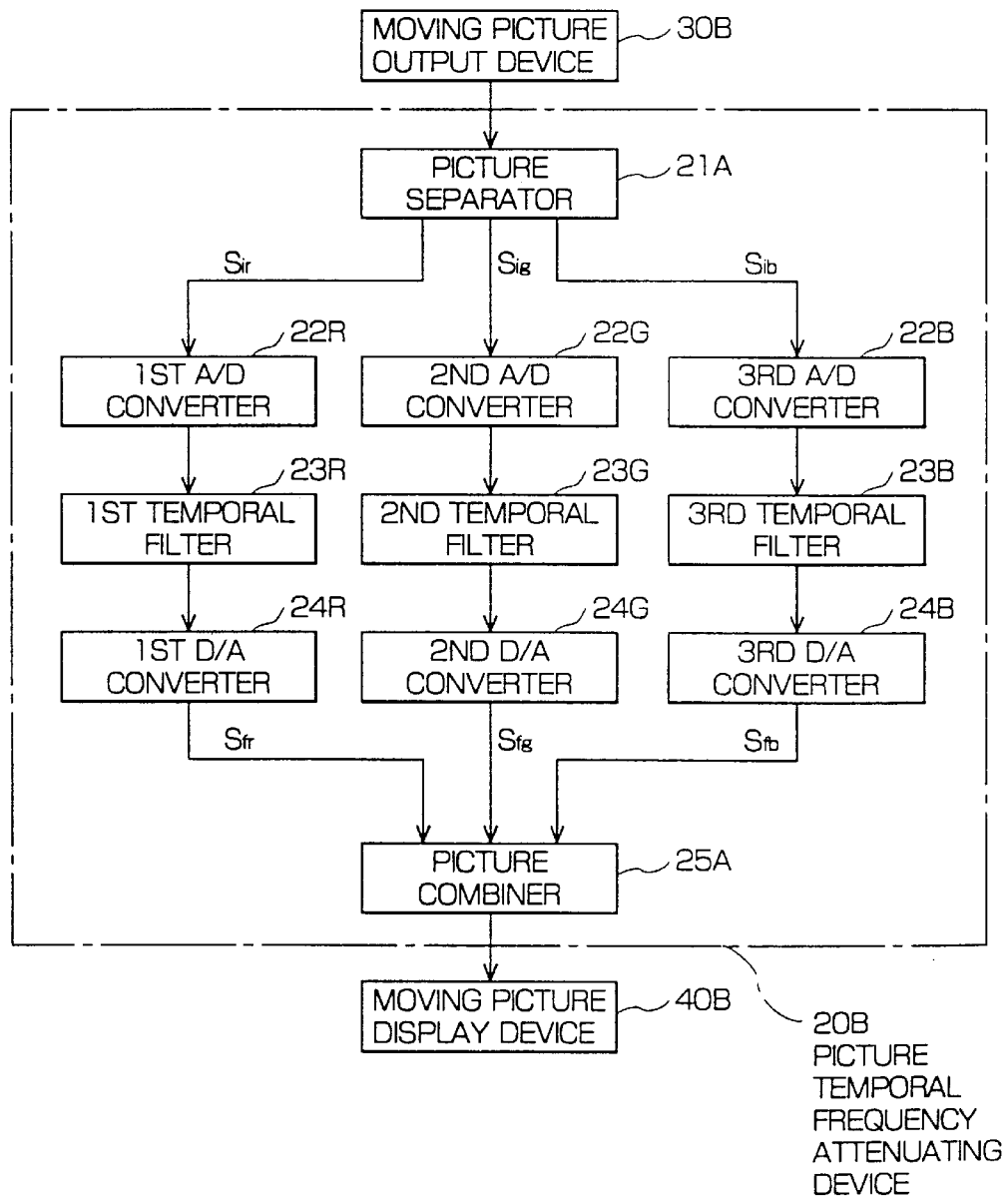
FIG. 10 is a block diagram of a picture temporal frequency attenuating device according to a third embodiment of this invention together with a moving picture output device and a moving picture display device.

Referring to FIG. 10, description will begin with a picture temporal frequency attenuating device 20B according to a third embodiment of this invention. The picture temporal frequency attenuating device 20B is connected between a moving picture output device 30B and a moving picture display device 40B. The illustrated moving picture output device 30 is non-interlaced scanning type.

The moving picture output device 30B produces an input analog moving picture signal indicative of input moving pictures. The input analog moving picture signal is supplied to the picture temporal frequency attenuating device 20B. In the manner which will later become clear, the picture temporal frequency attenuating device 20B selectively attenuates a particular frequency band of the input analog moving picture signal to produce, as an output analog moving picture signal, a smoothly-changing analog moving picture signal indicative of selectively frequency attenuated moving pictures. The output analog moving picture signal is supplied with the moving picture display device 40. The moving picture display device 40 has a display screen (not shown) on which the output analog moving picture signal is displayed.

As well known in the art, the input analog moving picture signal is decomposed into three analog moving picture signals, namely, an input red (R) analog moving picture signal, an input green (G) analog moving picture signal, and an input blue (B) analog moving picture signal.

The picture temporal frequency attenuating device 20B comprises a picture separator 21A, first through third analog-to-digital (A/D) converters 22R, 22G, and 22B, first through third temporal filters 23R, 23G, and 23B, first through third digital-to-analog (D/A) converters 24R, 24G, and 24B, and a picture combiner 25A. A combination of the first A/D converter 22R, the first temporal filter 23R, and the first D/A converter 24R is used for the input red analog moving picture signal. Similarly, a combination of the second A/D converters 22G, the second temporal filter 23G, and the second D/A converters 24G is used for the input green analog moving picture signal. A combination of the third A/D converter 22B, the third temporal filter 23B, and the third D/A converter 24B is used for the input blue analog moving picture signal.

The picture separator 21A is connected to the moving picture output device 30. The picture separator 21A separates the input analog moving picture signal into the input red analog moving picture signal $S_{ir}$, the input green analog moving picture signal $S_{ig}$, and the input blue analog moving picture signal $S_{ib}$. The input red analog moving picture signal, the input green analog moving picture signal, and the input blue analog moving picture signal are supplied to the first through the third A/D converters 22R, 22G, and the 22B.

The first through the third A/D converters 22R. 22G, and the 22B are connected to the picture separator 21A. The first A/D converter 22R converts the input red analog moving picture signal into an input red digital moving picture signal. Likewise, the second A/D converter 22G converts the input green analog moving picture signal into an input green digital moving picture signal. The third A/D converter 22B converts the input blue analog moving picture signal into an input blue digital moving picture signal. The input red digital moving picture signal, the input green digital moving picture signal, and the input blue digital moving picture signal are supplied to the first through the third temporal filters 23R, 23G, and 23B, respectively.

The first through the third temporal filters 23R, 23G, and 23B are connected to the first through the third A/D converters 22R, 22G, and 22B. The first temporal filter 22R carries out temporal filtering processing on the input red digital moving picture signal to attenuate the particular frequency band of the input red digital moving picture signal. The first temporal filter 23R produces a temporally filtered red digital moving picture signal. Similarly, the second temporal filter 22G carries out temporal filtering processing on the input green digital moving picture signal to attenuate the particular frequency band of the input green digital moving picture signal. The second temporal filter 23G produces a temporally filtered green digital moving picture signal. The third temporal filter 22B carries out temporal filtering processing on the input blue digital moving picture signal to attenuate the particular frequency band of the input blue digital moving picture signal. The third temporal filter 23B produces a temporally filtered blue digital moving picture signal. The temporally filtered red digital moving picture signal, the temporally filtered green digital moving picture signal, and the temporally filtered blue digital moving picture signal are supplied to the first through the third D/A converters 24R, 24G, and 24B, respectively.

The first through the third D/A converters 24R, 24G, and 24B are connected to the first through the third temporal filters 23R, 23G, and 23B. The first D/A converter 24R converts the temporally filtered red digital moving picture signal into a temporally filtered red analog moving picture signal $S_{fr}$. Likewise, the second D/A converter 24G converts the temporally filtered green digital moving picture signal into a temporally filtered green analog moving picture signal $S_{fg}$. The third D/A converter 24B converts the temporally filtered blue digital moving picture signal into a temporally filtered blue analog moving picture signal $S_{fb}$. The temporally filtered red analog moving picture signal $S_{fr}$, the temporally filtered green analog moving picture signal $S_{fg}$, and the temporally filtered blue analog moving picture signal $S_{fb}$ are supplied to the picture combiner 25A.

The picture combiner 25A is connected to the first through the third D/A converters 24R, 24G, and 24B. The picture combiner 25A combines the temporally filtered red analog moving picture signal $S_{fr}$, the temporally filtered green analog moving picture signal $S_{fg}$, and the temporally filtered blue analog moving picture signal $S_{fb}$ to produce the smoothly-changing analog moving picture signal. The smoothly-changing analog moving picture signal is supplied to the moving picture display device 40 as the output analog moving picture signal.

In the example being illustrated, the picture temporal frequency attenuating device 20B comprises the first through the third temporal filters 23R, 23G, and 23B for carrying out, in parallel, the temporal filtering processing on the input red digital moving picture signal, on the input green digital moving picture signal, and on the input blue digital moving picture signal, individually. The picture temporal frequency attenuating device 20B may comprise only one temporal filter for time-sharedly carrying out the temporal filtering processing on the input red digital moving picture signal, on the input green digital moving picture signal, and on the input blue digital moving picture signal in place of the first through the third temporal filters 23R, 23G, and 23B. In addition, each of the first through the third temporal filters 23R, 23G, and 23B may be modified into a combination of an interlace distributor, like in 26, a temporal filter, like in 23A, and an interlace combiner, like in 27 when the moving picture output device 30B is interlaced scanning type.

In the above-mentioned first through third embodiments, a degree of attenuation of the particular frequency band is constant.

Figure 11:
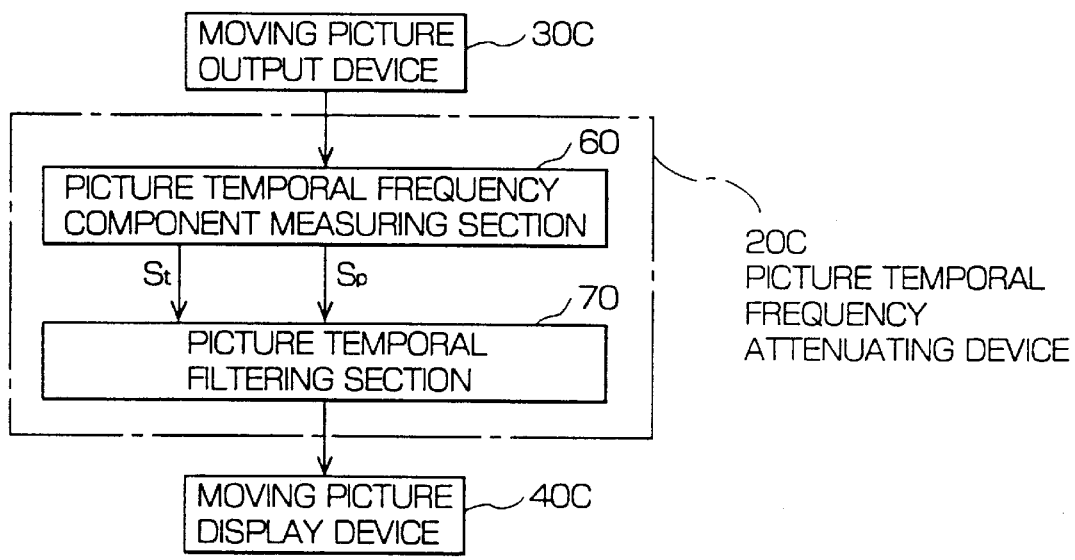
FIG. 11 is a block diagram of a picture temporal frequency attenuating device according to a fourth embodiment of this invention together with a moving picture output device and a moving picture display device.

Referring to FIG. 11, description will begin with a picture temporal frequency attenuating device 20C according to a fourth embodiment of this invention. The picture temporal frequency attenuating device 20C is connected between a moving picture output device 30C and a moving picture display device 40C. The illustrated moving picture output device 30C is non-interlaced scanning type.

The moving picture output device 30C produces an input digital moving picture signal indicative of input moving pictures. The input digital moving picture signal has three color components, namely, a red (R) component, a green (G) component, and a blue (B) component. The input digital moving picture signal is supplied to the picture temporal frequency attenuating device 20C. In the manner which will later become clear, the picture temporal frequency attenuating device 20C adaptively attenuates a particular frequency band of the input digital moving picture signal to produce, as an output digital moving picture signal, a smoothly-changing digital moving picture signal indicative of selectively frequency attenuated moving pictures. The output digital moving picture signal is supplied with the moving picture display device 40C. The moving picture display device 40C has a display screen (not shown) on which the output digital moving picture signal is displayed.

The picture temporal frequency attenuating device 20C comprises a picture temporal frequency component measuring section 60 and a picture temporal filtering section 70.

The picture temporal frequency component measuring section 60 is connected to the moving picture output device 30C. The picture temporal frequency component measuring section 60 measures the magnitude of temporal changes in RGB components of the input digital moving picture signal. The picture temporal frequency component measuring section 60 produces a time constant signal $S_t$ corresponding to the magnitude and an intermediate digital moving picture signal $S_p$. The time constant signal $S_t$ and the intermediate digital moving picture signal $S_p$ are supplied to the picture temporal filtering section 70.

The picture temporal filtering section 70 is connected to the picture temporal frequency component measuring section 60 and the moving picture display device 40C. The picture temporal filtering section 70 carries out, in response to the time constant signal $S_t$, temporal filtering processing on the RGB components of the intermediate digital moving picture signal $S_p$ to adaptively attenuate the particular frequency band of the intermediate digital moving picture signal $S_p$. The temporal filtering processing are carried out on each of the red component, the green component, and the blue component, individually. The picture temporal filtering section 70 produces a temporally filtered digital moving picture signal. The temporally filtered digital moving picture signal is supplied to the moving picture display device 40C as the output digital moving picture signal.

Figure 12:
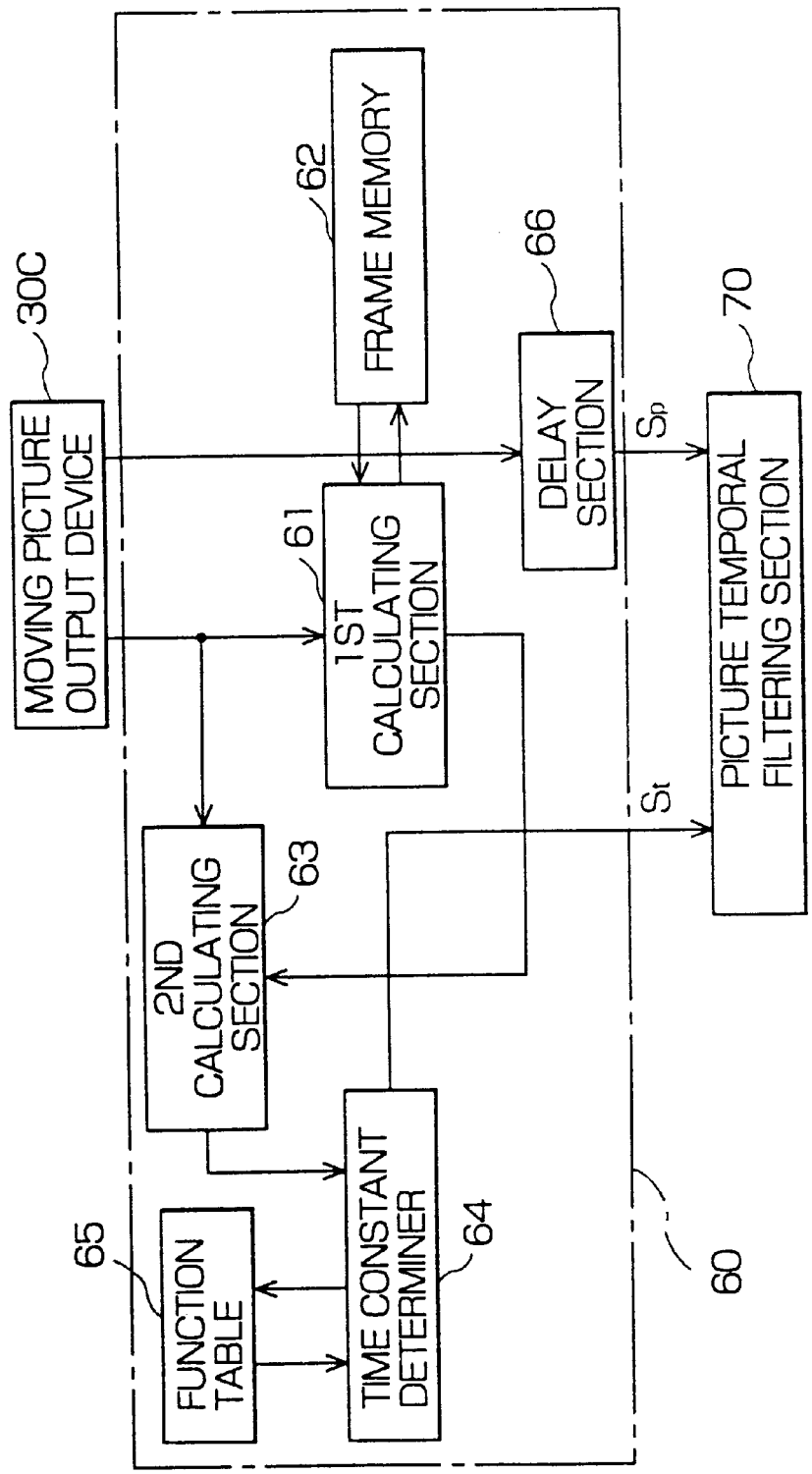
FIG. 12 is a block diagram of a picture temporal frequency component measuring section for use in the picture temporal frequency attenuating device illustrated in FIG. 11.

Turning to FIG. 12, the picture temporal frequency component measuring section 60 comprises a first calculating section 61, a frame memory 62, a second calculating section 63, a time constant determiner 64, a function table 65, and a delay section 66.

The input digital moving picture signal is supplied to the first calculating section 61, the second calculating section 63, and the delay section 66.

It is assumed that the input digital moving picture signal is represented by current picture data $I_{x,y}(t)$ on coordinate (x, y) at a current time instant t. In addition, the frame memory 62 stores a previous calculated frame which is represented by previous calculated picture data $A(0)_{x,y}(t-1)$ at a previous time instant (t−1). Under the circumstance, the first calculating section 61 calculates current calculated picture data $A(0)_{x,y}(t)$ by using the current picture data $I_{x,y}(t)$ and the previous calculated picture data $A(O)_{x,y}(t-1)$ in accordance with Equation (10) which is represented by:

$$A(0)_{x,y}(t)=\tau_0 A(0)_{x,y}(t-1)+(1-\tau_0)I_{x,y}(t), \qquad (10)$$

where $\tau_0$ represents a predetermined time constant which has a value between zero and one, both exclusive, namely, ($0<\tau_0<1$). The predetermined time constant $\tau_0$ is equal to, for example, zero point three, namely, 0.3. The first calculating section 81 supplies the frame memory 61 and the second calculating section 63 with a current calculated frame indicative of the current calculated picture data $A(0)_{x,y}(t)$. A combination of the first calculating section 61 and the frame memory 62 serves as a recursive picture filter.

The second calculating section 63 calculates an effective attenuation E(t) by using the current picture data $I_{x,y}(t)$ and the current calculated picture data $A(0)_{x,y}(t)$ in accordance with Equation (11) which is represented by:

$$E(t) = \frac{\sum_{x,y} |I_{x,y}(t) - A(0)_{x,y}(t)|}{\varepsilon} \qquad (11)$$

where $\varepsilon$ represents a constant which is preliminarily set using a picture data value $I_{max}$ indicative of a maximum brightness as follows:

$$\varepsilon = \sum_{x,y} I_{max}. \qquad (12)$$

The effective attenuation $E(t)$ is supplied to the time constant determiner 64. The time constant determiner 64 determines a time constant value $\tau(t)$ on the basis of the effective attenuation $E(t)$ as follows:

$$\tau(t) = \begin{cases} 0; & E(t) < E_{min} \\ \tau_{max}; & E(t) > E_{max} \\ F[E(t)]; & \text{otherwise,} \end{cases}$$

where $F[E(t)]$ represents a value which is preliminarily stored in the function table 65 for the effective attenuation $E(t)$, and $E_{min}$, $E_{max}$, and $\tau_{max}$ represent predetermined suitable value so that $(0 \leq E_{min} < E_{max} \leq 1)$ and $(0 < \tau_{max} < 1)$. For example, $E_{min}$ is equal to 0.04, $E_{max}$ is equal to 0.08, and $\tau_{max}$ is equal to 0.3. The value $F[E(t)]$ is given by as follows:

$$F[E(t)] = \frac{1 + \tanh\left[k\left[\left[\frac{E(t) - E_{min}}{E_{max} - E_{min}}\right] - e_0\right]\right]}{2} \tau_{max},$$

where $k$ and $e_0$ represent parameters so that $(1<k)$ and $(0<e_0<1)$. For example, the parameter $k$ is equal to 4 and the parameter $e_0$ is equal to 0.5. The time constant determiner 64 supplies the picture temporal frequency component measuring section 60 with the time constant signal $S_t$ indicative of the time constant value $\tau(t)$. A combination of the time constant determiner 64 and the function table 65 acts as a time constant determining section.

The delay section 66 is supplied with the input digital moving picture signal from the moving picture output device 30C. The delay section 66 delays the input digital moving picture signal to produce the intermediate digital moving picture signal $S_p$ in synchronism with the the time constant signal $S_t$.

Figure 13:
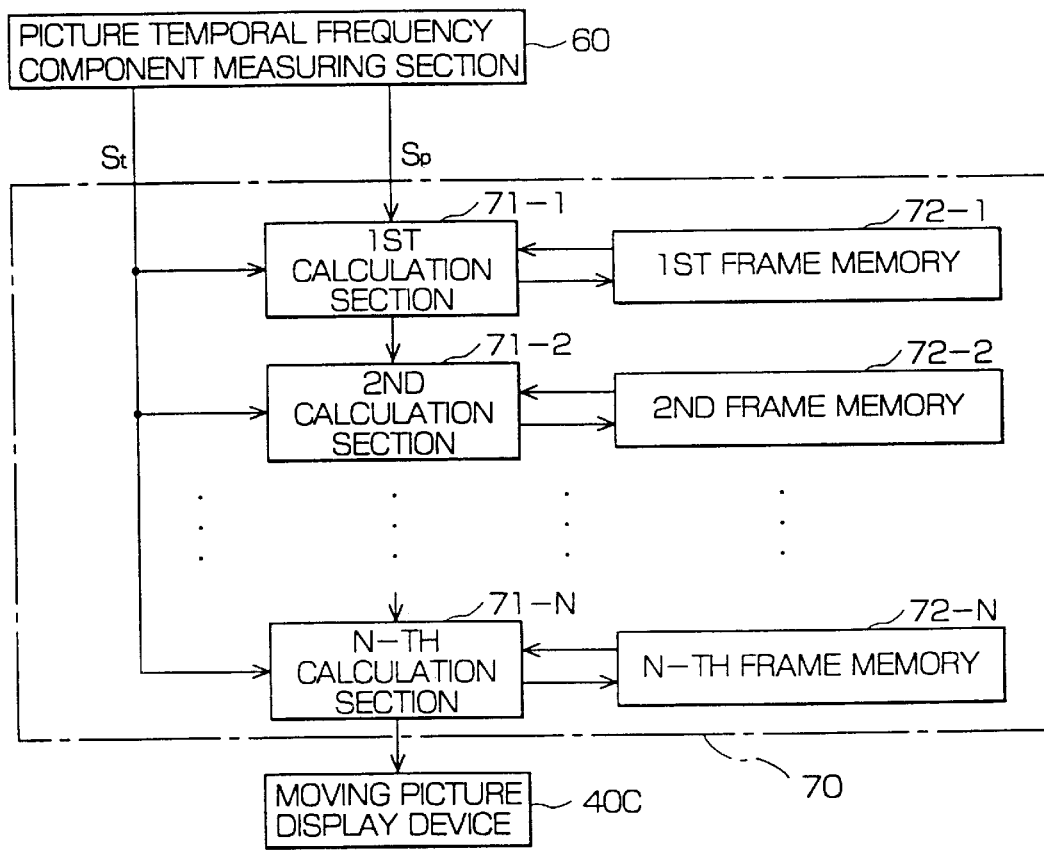
FIG. 13 is a block diagram of a picture temporal filtering section for use in the picture temporal frequency attenuating device illustrated in FIG. 11.

Turning to FIG. 13, the picture temporal filtering section 70 comprises first through N-th calculation sections 71-1, 71-2, ..., and 71-N and first through N-th frame memories 72-1, 72-2, ..., and 72-N.

The first calculation section 71-1 is connected to the picture temporal frequency component measuring section 60. The first calculation section 71-1 is supplied with the intermediate digital moving picture signal $S_p$. The first through the N-th calculation sections 71-1 to 71-N are connected to each other in cascade. The first through the N-th calculation sections 71-1 to 71-N are connected to the first through the N-th frame memories 72-1 to 72-N, respectively. The N-th calculation section 71-N is connected to moving picture display device 40C. The first through the N-th calculation sections 71-1 to 71-N are connected to the picture temporal frequency component measuring section 60. Each of the first through the N-th calculation sections 71-1 to 71-N is supplied to the time constant signal $S_t$.

It is presumed that the picture temporal frequency component measuring section 60 produces the intermediate digital moving picture signal $S_p$ indicative of current picture date $A(0)_{x,y}(t)$ on coordinate $(x, y)$ at the current time instant $t$. In addition, the first through the N-th frame memories 72-1 to 72-N store first through N-th calculated frames indicative of first through N-th previous filtered picture data $A(1)_{x,y}(t-1)$, $A(2)_{x,y}(t-1)$, ..., $A(N)_{x,y}(t-1)$ at the previous time instant $(t-1)$, respectively.

Under the circumstances, the first calculation section 71-1 calculates first current filtered picture data $A(1)_{x,y}(t)$ on the basis of the current picture data $A(0)_{x,y}(t)$ and the first previous filtered picture data $A(1)_{x,y}(t-1)$ by using the time constant value $\tau(t)$ in accordance with Equation (13) which is represented by:

$$A(1)_{x,y}(t) = \tau(t)A(1)_{x,y}(t-1) + (1-\tau(t))A(0)_{x,y}(t). \qquad (13)$$

The first calculation section 71-1 supplies the first frame memory 72-1 and the second calculation section 71-2 with a first calculated frame indicative of the first current filtered picture data $A(1)_{x,y}(t)$.

In general, an n-th calculation section 71-n calculates n-th current filtered picture data $A(n)_{x,y}(t)$ on the basis of n-th previous filtered picture data $A(n)_{x,y}(t-1)$ and $(n-1)$-th current filtered picture data $A(n-1)_{x,y}(t)$ by using the time constant value $\tau(t)$ in accordance with Equation (14) which is represented by:

$$A(n)_{x,y}(t) = \tau(t)A(n)_{x,y}(t-1) + (1-\tau(t))A(n-1)_{x,y}(t). \qquad (14)$$

Thus, the N-th calculation section 71-N supplies the moving picture display device 40C and the N-th frame memory 72-N with, as the output digital moving picture signal, an N-th calculated frame indicative of the N-th current filtered picture data $A(n)_{x,y}(t)$.

In the illustrated picture temporal frequency attenuating device 20C, the moving picture output device 30C supplies the picture temporal frequency attenuating device 20C with the input digital moving picture signal having three color (RGB) components. The moving picture output device 30C may supply the picture temporal frequency attenuating device 20C with an input digital moving picture signal having a luminance component. In addition, the moving picture output device 30C may supply the picture temporal frequency attenuating device 20C with an input analog moving picture signal in place of the input digital moving picture signal.

In the embodiment shown FIGS. 11 to 13, the picture temporal frequency component measuring section 60 measures an amount of temporal frequency component in the whole picture where brightness changes at a range between 7 Hz and 60 Hz which is human sensitive. Responsive to the amount, the picture temporal filtering section 70 adaptively attenuates the human sensitive temporal frequency component of the input moving picture signal. With this structure, it is possible for a VDT user to prevent excessive VDT stress disease without a feeling of physical disorder on seeing a video signal indicative of moving pictures displayed on a display screen of a VDT.

What is claimed is:

1. A picture temporal frequency attenuating device for selectively attenuating a particular frequency band of an input analog moving picture signal indicative of input moving pictures supplied from a moving picture output device of interlaced scanning type to produce a smoothly-changing analog moving picture signal indicative of selectively frequency attenuated moving pictures, the particular frequency band including human sensitive frequency components, said picture temporal frequency attenuating device comprising:

a picture separator, connected to said moving picture output device, for separating the input analog moving picture signal into an input analog luminance signal and input analog chromaticity signals;

an analog-to-digital converter, connected to said picture separator, for converting the input analog luminance signal into an input digital luminance signal indicative of luminance values of the input analog moving picture signal;

an interlace distributor, connected to said analog-to-digital converter, for distributing the input digital luminance signal into an input odd-field digital luminance signal and an input even-field digital luminance signal;

a temporal filter, connected to said interlace distributor, for carrying out temporal filtering processing on the input odd-field digital luminance signal and on the input even-field digital luminance signal to attenuate the particular frequency band of the input odd-field digital luminance signal and of the input even-field digital luminance signal, said temporal filter producing a temporally filtered odd-field digital luminance signal and a temporally filtered even-field digital luminance signal;

an interlace combiner, connected to said temporal filter, for temporally and alternately combining the temporally filtered odd-field digital luminance signal with the temporally filtered even-field digital luminance signal to produce a temporally filtered digital luminance signal;

a digital-to-analog converter, connected to said interlace combiner, for converting the temporally filtered digital luminance signal into a temporally filtered analog luminance signal; and a picture combiner, connected to said digital-to-analog converter and said picture separator, for combining the temporally filtered analog luminance signal with the input analog chromaticity signals to produce the smoothly-changing analog moving picture signal.

2. A picture temporal frequency attenuating device as claimed in claim 1, wherein said temporal filter comprises:

first through N-th input odd-field memories, connected to said interlace distributor and connected to each other in cascade, where N represents a positive integer which is not less than two, said first input odd-field memory storing, as a first stored luminance odd field, the input odd-field digital luminance signal odd field by odd field, an n-th input odd-field memory storing an (n−1)-th stored luminance odd field as an n-th stored luminance odd field, where n represents a variable between 2 through N, both inclusive;

first through N-th input even-field memories, connected to said interlace distributor and connected to each other in cascade, said first input even-field memory storing, as a first stored luminance even field, the input even-field digital luminance signal even field by even field, an n-th input even-field memory storing an (n−1)-th stored luminance even field as an n-th stored luminance even field;

a summing circuit connected to said first through said N-th input odd-field memories and having first through N-th odd-field weighting factors for said first through said N-th input odd-field memories, respectively, said summing circuit calculating an N term odd sum of the luminance values of the first through the N-th stored luminance odd fields weighted by the first through the N-th odd-field weighting factors pixel by pixel to produce a summed luminance odd field indicative of an N term odd sum result, said summing circuit further being connected to said first through said N-th input even-field memories and having first through N-th even-field weighting factors for said first through said N-th input even-field memories, respectively, said summing circuit calculating an N term even sum of the luminance values of the first through the N-th stored luminance even fields weighted by the first through the N-th even-field weighting factors pixel by pixel to produce a summed luminance even field indicative of an N term even sum result;

an output odd-field memory, connected to said summing circuit, for storing the summed luminance odd field as an output luminance odd field, said output odd-field memory producing the output luminance odd field as the temporally filtered odd-field digital luminance signal; and an output even-field memory, connected to said summing circuit, for storing the summed luminance even field as an output luminance even field, said output even-field memory producing the output luminance even field as the temporally filtered even-field digital luminance signal.

3. A picture temporal frequency attenuating device as claimed in claim 1, wherein said temporal filter comprises:

first through N-th input odd-field memories, connected to said interlace distributor and connected to each other in cascade, where N represents a positive integer which is not less than two, said first input odd-field memory storing, as a first stored luminance odd field, the input odd-field digital luminance signal odd field by odd field, an n-th input odd-field memory storing an (n−1)-th stored luminance odd field as an n-th stored luminance odd field, where n represents a variable between 2 through N, both inclusive;

an odd summing circuit connected to said first through said N-th input odd-field memories and having first through N-th odd-field weighting factors for said first through said N-th input odd-field memories, respectively, said odd summing circuit calculating an N term odd sum of the luminance values of the first through the N-th stored luminance odd fields weighted by the first through the N-th odd-field weighting factors pixel by pixel to produce a summed luminance odd field indicative of an N term odd sum result, an output odd-field memory, connected to said odd summing circuit, for storing the summed luminance odd field as an output luminance odd field, said output odd-field memory producing the output luminance odd field as the temporally filtered odd-field digital luminance signal;

first through N-th input even-field memories, connected to said interlace distributor and connected to each other in cascade, said first input even-field memory storing, as a first stored luminance even field, the input even-field digital luminance signal even field by even field, an n-th input even-field memory storing an (n−1)-th stored luminance even field as an n-th stored luminance even field;

an even summing circuit connected to said first through said N-th input even-field memories and having first through N-th even-field weighting factors for said first through said N-th input even-field memories, respectively, said even summing circuit calculating an N term even sum of the luminance values of the first through the N-th stored luminance even fields weighted by the first through the N-th even-field weighting factors pixel by pixel to produce a summed luminance even field indicative of an N term even sum result; and an output even-field memory, connected to said even summing circuit, for storing the summed luminance even field as an output luminance even field, said output even-field memory producing the output luminance even field as the temporally filtered even-field digital luminance signal.

4. A picture temporal frequency attenuating device as claimed in claim 1, wherein said temporal filter comprises:

an input odd-field memory, connected to said interlace distributor, for storing, as an input stored luminance odd field, the input odd-field digital luminance signal odd field by odd field;

first through N-th intermediate odd-field memories for storing, as first through N-th stored intermediate luminance odd fields, an odd field previously inputted to the input stored luminance odd field by one frame, where N represents a positive integer which is not less than two;

first through N-th odd calculation circuits connected to said input frame memory and connected to said first through said N-th intermediate odd-field memories, respectively, an n-th odd calculation circuit calculating average of the input stored luminance odd field and the n-th stored intermediate luminance odd field, where n represents a variable between 1 through N, both inclusive, said n-th odd calculation circuit making said n-th intermediate odd-field memory store an n-th mean intermediate luminance odd field as an n-th refreshed stored intermediate luminance odd field;

an odd summing circuit, connected to said first through said N-th intermediate odd-field memories, for calculating an N term odd sum of the luminance values of the first through the N-th stored intermediate luminance odd fields pixel by pixel to produce a summed luminance odd field indicative of an N term odd sum result;

an output odd-field memory, connected to said odd summing circuit, for storing the summed luminance odd field as an output luminance odd field, said output odd-field memory producing the output luminance odd field as the temporally filtered odd-field digital luminance signal;

an input even-field memory, connected to said interlace distributor, for storing, as an input stored luminance even field, the input even-field digital luminance signal even field by even field;

first through N-th intermediate even-field memories for storing, as first through N-th stored intermediate luminance even fields, an even field previously inputted to the input stored luminance even field by one frame;

first through N-th even calculation circuits connected to said input frame memory and connected to said first through said N-th intermediate even-field memories, respectively, an n-th even calculation circuit calculating average of the input stored luminance even field and the n-th stored intermediate luminance even field, said n-th even calculation circuit making said n-th intermediate even-field memory store an n-th mean intermediate luminance even field as an n-th refreshed stored intermediate luminance even field;

an even summing circuit, connected to said first through said N-th intermediate even-field memories, for calculating an N term even sum of the luminance values of the first through the N-th stored intermediate luminance even fields pixel by pixel to produce a summed luminance even field indicative of an N term even sum result; and an output even-field memory, connected to said even summing circuit, for storing the summed luminance even field as an output luminance even field, said output even-field memory producing the output luminance even field as the temporally filtered even-field digital luminance signal.

5. A picture temporal frequency attenuating device as claimed in claim 1, wherein said temporal filter comprises:

an input odd-field memory, connected to said interlace distributor, for storing, as an input stored luminance odd field indicative of current odd-field luminance data, the input odd-field digital luminance signal odd field by odd field;

first through N-th intermediate odd-field memories for storing an odd field previously inputted to the input stored luminance odd field by one frame as first through N-th stored intermediate luminance odd fields indicative of first through N-th filtered odd-field luminance data, where N represents a positive integer which is not less than two;

first through N-th odd calculation circuits connected to said input odd-field memory and connected to said first through said N-th intermediate odd-field memories, respectively, said first through said N-th odd calculation circuits being connected to each other in cascade, said first odd calculation circuit calculating first new filtered odd-field luminance data by using the current odd-field luminance data, the first filtered odd-field luminance data, and a first positive parameter less than one in accordance with a predetermined equation, an n-th odd calculation circuit calculating n-th new filtered odd-field luminance data by using n-th filtered odd-field luminance data, (n−1)-th filtered odd-field luminance data, and an n-th positive parameter less than one in accordance with the predetermined equation, where n represents a variable between 2 through N, both inclusive, said first through said N-th odd calculation circuit supplying said first through said N-th intermediate odd-field memories with first through N-th calculated intermediate luminance odd fields indicative of the first through the N-th new filtered odd-field luminance data, respectively;

an output odd-field memory, connected to said N-th odd calculation circuit, for storing the N-th calculated intermediate luminance odd field as an output luminance odd field, said output odd-field memory producing the output luminance odd field as the temporally filtered odd-field digital luminance signal;

an input even-field memory, connected to said interlace distributor, for storing, as an input stored luminance even field indicative of current even-field luminance data, the input even-field digital luminance signal even field by even field;

first through N-th intermediate even-field memories for storing an even field previously inputted to the input stored luminance even field by one frame as first through N-th stored intermediate luminance even fields indicative of first through N-th filtered even-field luminance data;

first through N-th even calculation circuits connected to said input even-field memory and connected to said first through said N-th intermediate even-field memories, respectively, said first through said N-th even calculation circuits being connected to each other in cascade, said first even calculation circuit calculating first new filtered even-field luminance data by using the current even-field luminance data, the first filtered even-field luminance data, and the first positive parameter in accordance with the predetermined equation, an n-th even calculation circuit calculating n-th new filtered even-field luminance data by using n-th filtered even-field luminance data, (n−1)-th filtered even-field luminance data, and the n-th positive parameter in accordance with the predetermined equation, said first through said N-th even calculation circuit supplying said first through said N-th intermediate even-field memories with first through N-th calculated intermediate luminance even fields indicative of the first through the N-th new filtered even-field luminance data, respectively; and an output even-field memory, connected to said N-th even calculation circuit, for storing the N-th calculated intermediate luminance even field as an output luminance even field, said output even-field memory producing the output luminance even field as the temporally filtered even-field digital luminance signal.

6. A picture temporal frequency attenuating device as claimed in claim 1, wherein said temporal filter comprises:

an input odd-field memory, connected to said interlace distributor, for storing, as an input stored luminance odd field indicative of current odd-field luminance data, the input odd-field digital luminance signal odd field by odd field;

an intermediate odd-field memory for storing an odd field previously inputted to the input stored luminance odd field by one frame as a stored intermediate luminance odd field indicative of filtered odd-field luminance data;

an odd calculation circuit, connected to said input odd-field memory and connected to said intermediate odd-field memory, for calculating new filtered odd-field luminance data by using the current odd-field luminance data, the filtered odd-field luminance data, and a positive parameter less than one in accordance with a predetermined equation, said odd calculation circuit supplying said intermediate odd-field memory with a calculated intermediate luminance odd field indicative of the new filtered odd-field luminance data;

an output odd-field memory, connected to said odd calculation circuit, for storing the calculated intermediate luminance odd field as an output luminance odd field, said output odd-field memory producing the output luminance odd field as the temporally filtered odd-field digital luminance signal;

an input even-field memory, connected to said interlace distributor, for storing, as an input stored luminance even field indicative of current even-field luminance data, the input even-field digital luminance signal even field by even field;

an intermediate even-field memory for storing an even field previously inputted to the input stored luminance even field by one frame as a stored intermediate luminance even field indicative of filtered even-field luminance data;

an even calculation circuit, connected to said input even-field memory and connected to said intermediate even-field memory, for calculating new filtered even-field luminance data by using the current even-field luminance data, the filtered even-field luminance data, and the positive parameter in accordance with the predetermined equation, said even calculation circuit supplying said intermediate even-field memory with a calculated intermediate luminance even field indicative of the new filtered even-field luminance data; and an output even-field memory, connected to said even calculation circuit, for storing the calculated intermediate luminance even field as an output luminance even field, said output even-field memory producing the output luminance even field as the temporally filtered even-field digital luminance signal.

7. A picture temporal frequency attenuating device as claimed in claim 1, wherein the particular frequency band lies on a range not less than 7 Hz.

8. A picture temporal frequency attenuating device as claimed in claim 1, wherein the particular frequency band lies on a range between 7 Hz and 60 Hz, both inclusive.

9. A picture temporal frequency attenuating device as claimed in claim 1, wherein the particular frequency band lies on a range between 7 Hz and 15 Hz, both inclusive.

10. A picture temporal frequency attenuating device for selectively attenuating a particular frequency band of an input analog moving picture signal indicative of input moving pictures supplied from a moving picture output device of non-interlaced scanning type to produce a smoothly-changing analog moving picture signal indicative of selectively frequency attenuated moving pictures, the particular frequency band including human sensitive frequency components, said picture temporal frequency attenuating device comprising:

a picture separator, connected to said moving picture output device, for separating the input analog moving picture signal into an input red analog moving picture signal, an input green analog moving picture signal, and an input blue analog moving picture signal;

a first analog-to-digital converter, connected to said picture separator, for converting the input red analog moving picture signal into an input red digital moving picture;

a second analog-to-digital converter, connected to said picture separator, for converting the input green analog moving picture signal into an input green digital moving picture;

a third analog-to-digital converter, connected to said picture separator, for converting the input blue analog moving picture signal into an input blue digital moving picture;

a first temporal filter, connected to said first analog-to-digital converter, for carrying out temporal filtering processing on the input red digital moving picture signal to attenuate the particular frequency band of the input red digital moving picture signal, said first temporal filter producing a temporally filtered red digital moving picture signal;

a second temporal filter, connected to said second analog-to-digital converter, for carrying out temporal filtering processing on the input green digital moving picture signal to attenuate the particular frequency band of the input green digital moving picture signal, said second temporal filter producing a temporally filtered green digital moving picture signal;

a third temporal filter, connected to said third analog-to-digital converter, for carrying out temporal filtering processing on the input blue digital moving picture signal to attenuate the particular frequency band of the input blue digital moving picture signal, said third temporal filter producing a temporally filtered blue digital moving picture signal;

a first digital-to-analog converter, connected to said first temporal filter, for converting the temporally filtered red digital moving picture signal into a temporally filtered red analog moving picture signal;

a second digital-to-analog converter, connected to said second temporal filter, for converting the temporally filtered green digital moving picture signal into a temporally filtered green analog moving picture signal;

a third digital-to-analog converter, connected to said third temporal filter, for converting the temporally filtered blue digital moving picture signal into a temporally filtered blue analog moving picture signal; and a picture combiner, connected to said first through said third digital-to-analog converters, for combining the temporally filtered red analog moving picture signal, the temporally filtered green analog moving picture signal, and the temporally filtered blue analog moving picture signal to produce the smoothly-changing analog moving picture signal.

11. A picture temporal frequency attenuating device as claimed in claim 10, wherein the particular frequency band lies on a range not less than 7 Hz.

12. A picture temporal frequency attenuating device as claimed in claim 10, wherein the particular frequency band lies on a range between 7 Hz and 60 Hz, both inclusive.

13. A picture temporal frequency attenuating device as claimed in claim 10, wherein the particular frequency band lies on a range between 7 Hz and 15 Hz, both inclusive.

14. A picture temporal frequency attenuating device for selectively attenuating a particular frequency band of an input analog moving picture signal indicative of input moving pictures supplied from a moving picture output device of non-interlaced scanning type to produce a smoothly-changing analog moving picture signal indicative of selectively frequency attenuated moving pictures, the particular frequency band including human sensitive frequency components, said picture temporal frequency attenuating device comprising:

a picture separator, connected to said moving picture output device, for separating the input analog moving picture signal into an input red analog moving picture signal, an input green analog moving picture signal, and an input blue analog moving picture signal;

a first analog-to-digital converter, connected to said picture separator, for converting the input red analog moving picture signal into an input red digital moving picture;

a second analog-to-digital converter, connected to said picture separator, for converting the input green analog moving picture signal into an input green digital moving picture;

a third analog-to-digital converter, connected to said picture separator, for converting the input blue analog moving picture signal into an input blue digital moving picture;

a temporal filter, connected to said first through said third analog-to-digital converters, for time-sharedly carrying out temporal filtering processing on the input red digital moving picture signal, on the input green digital moving picture signal, and on the input blue digital moving picture signal to attenuate the particular frequency band of the input red digital moving picture signal, of the input green digital moving picture signal, and of the input blue digital moving picture signal, said temporal filter producing a temporally filtered red digital moving picture signal, a temporally filtered green digital moving picture signal, and a temporally filtered blue digital moving picture signal;

a first digital-to-analog converter, connected to said temporal filter, for converting the temporally filtered red digital moving picture signal into a temporally filtered red analog moving picture signal;

a second digital-to-analog converter, connected to said temporal filter, for converting the temporally filtered green digital moving picture signal into a temporally filtered green analog moving picture signal;

a third digital-to-analog converter, connected to said temporal filter, for converting the temporally filtered blue digital moving picture signal into a temporally filtered blue analog moving picture signal; and a picture combiner, connected to said first through said third digital-to-analog converters, for combining the temporally filtered red analog moving picture signal, the temporally filtered green analog moving picture signal, and the temporally filtered blue analog moving picture signal to produce the smoothly-changing analog moving picture signal.

15. A picture temporal frequency attenuating device as claimed in claim 14, wherein the particular frequency band lies on a range not less than 7 Hz.

16. A picture temporal frequency attenuating device as claimed in claim 14, wherein the particular frequency band lies on a range between 7 Hz and 60 Hz, both inclusive.

17. A picture temporal frequency attenuating device as claimed in claim 14, wherein the particular frequency band lies on a range between 7 Hz and 15 Hz, both inclusive.

18. A picture temporal frequency attenuating device for selectively attenuating a particular frequency band of an input analog moving picture signal indicative of input moving pictures supplied from a moving picture output device of interlaced scanning type to produce a smoothly-changing analog moving picture signal indicative of selectively frequency attenuated moving pictures, the particular frequency band including human sensitive frequency components, said picture temporal frequency attenuating device comprising:

a picture separator, connected to said moving picture output device, for separating the input analog moving picture signal into an input red analog moving picture signal, and an input green analog moving picture signal, and an input blue analog moving picture signal;

a first analog-to-digital converter, connected to said picture separator, for converting the input red analog moving picture signal into an input red digital moving picture signal;

a second analog-to-digital converter, connected to said picture separator, for converting the input green analog moving picture signal into an input green digital moving picture signal;

a third analog-to-digital converter, connected to said picture separator, for converting the input blue analog moving picture signal into an input blue digital moving picture signal;

a first interlace distributor, connected to said first analog-to-digital converter, for distributing the input red digital moving picture signal into an input odd-field red digital moving picture signal and an input even-field red digital moving picture signal;

a second interlace distributor, connected to said second analog-to-digital converter, for distributing the input green digital moving picture signal into an input odd-field green digital moving picture signal and an input even-field green digital moving picture signal;

a third interlace distributor, connected to said third analog-to-digital converter, for distributing the input blue digital moving picture signal into an input odd-field blue digital moving picture signal and an input even-field blue digital moving picture signal;

a first temporal filter, connected to said first interlace distributor, for carrying out temporal filtering processing on the input odd-field red digital moving picture signal and on the input even-field red digital moving picture signal to attenuate the particular frequency band of the input odd-field red digital moving picture signal and of the input even-field red digital moving picture signal, said first temporal filter producing a temporally filtered odd-field red digital moving picture signal and a temporally filtered even-field red digital moving picture signal;

a second temporal filter, connected to said second interlace distributor, for carrying out temporal filtering processing on the input odd-field green digital moving picture signal and on the input even-field green digital moving picture signal to attenuate the particular frequency band of the input odd-field green digital moving picture signal and of the input even-field green digital moving picture signal, said second temporal filter producing a temporally filtered odd-field green digital moving picture signal and a temporally filtered even-field green digital moving picture signal;

a third temporal filter, connected to said third interlace distributor, for carrying out temporal filtering processing on the input odd-field blue digital moving picture signal and on the input even-field blue digital moving picture signal to attenuate the particular frequency band of the input odd-field blue digital moving picture signal and of the input even-field blue digital moving picture signal, said third temporal filter producing a temporally filtered odd-field blue digital moving picture signal and a temporally filtered even-field blue digital moving picture signal;

a first interlace combiner, connected to said first temporal filter, for temporally and alternately combining the temporally filtered odd-field red digital moving picture signal with the temporally filtered even-field red digital moving picture signal to produce a temporally filtered red digital moving picture signal;

a second interlace combiner, connected to said second temporal filter, for temporally and alternately combining the temporally filtered odd-field green digital moving picture signal with the temporally filtered even-field green digital moving picture signal to produce a temporally filtered green digital moving picture signal;

a third interlace combiner, connected to said third temporal filter, for temporally and alternately combining the temporally filtered odd-field blue digital moving picture signal with the temporally filtered even-field blue digital moving picture signal to produce a temporally filtered blue digital moving picture signal;

a first digital-to-analog converter, connected to said first interlace combiner, for converting the temporally filtered red digital moving picture signal into a temporally filtered red analog moving picture signal;

a second digital-to-analog converter, connected to said second interlace combiner, for converting the tempo-rally filtered green digital moving picture signal into a temporally filtered green analog moving picture signal;

a third second digital-to-analog converter, connected to said third interlace combiner, for converting the temporally filtered blue digital moving picture signal into a temporally filtered blue analog moving picture signal; and a picture combiner, connected to said first through said third digital-to-analog converters, for combining the temporally filtered red analog moving picture signal, the temporally filtered green analog moving picture signal, and the temporally filtered blue analog moving picture signal to produce the smoothly-changing analog moving picture signal.

19. A picture temporal frequency attenuating device as claimed in claim 18, wherein the particular frequency band lies on a range not less than 7 Hz.

20. A picture temporal frequency attenuating device as claimed in claim 18, wherein the particular frequency band lies on a range between 7 Hz and 60 Hz, both inclusive.

21. A picture temporal frequency attenuating device as claimed in claim 18, wherein the particular frequency band lies on a range between 7 Hz and 15 Hz, both inclusive.

22. A picture temporal frequency attenuating device for adaptively attenuating a particular temporal frequency band of an input moving picture signal indicative of input moving pictures supplied from a moving picture output device to produce a smoothly-changing moving picture signal indicative of adaptively frequency attenuated moving pictures, the particular temporal frequency band including human sensitive frequency components, said picture temporal frequency attenuating device comprising:

a picture temporal frequency component measuring section, connected to said moving picture output device, for measuring magnitude of temporal changes in a luminance component of the input moving picture singal, said picture temporal frequency component measuring section producing an intermediate moving picture signal and a time constant signal corresponding to the magnitude of the temporal changes; and a picture temporal filtering section, connected to said picture temporal frequency component measuring section, for carrying out, in response to the time constant signal, temporal filtering processing on the luminance component of the intermediate moving picture signal to adaptively attenuate the particular temporal frequency band of the intermediate moving picture signal, said picture temporal filtering section producing a temporally filtered moving picture signal as the smoothly-changing moving picture signal.

23. A picture temporal frequency attenuating device as claimed in claim 22, wherein the input moving picture signal is an analog signal.

24. A picture temporal frequency attenuating device as claimed in claim 22, wherein the input moving picture signal is a digital signal.

25. A picture temporal frequency attenuating device as claimed in claim 22, the input moving picture signal being represented by current picture data, wherein said picture temporal frequency component measuring section comprises:

a frame memory for storing a previous calculated frame indicative of previous calculated picture data;

a first calculating section, connected to said moving picture output device and said frame memory, for calculating current calculated picture data by using the current picture data, the previous calculated picture data, and a predetermined time constant in accordance with a first predetermined equation, said first calculating section supplying said frame memory with a current calculated frame indicative of the current calculated picture data;

a second calculating section, connected to said moving picture output device and said first calculating section, for calculating an effective attenuation by using the current picture data and the current calculated picture data in accordance with a second predetermined equation;

a time constant determining section, connected to said second calculating section, for determining a time constant value on the basis of the effective attenuation, said time constant determining section producing the time constant signal indicative of the time constant value; and a delay section, connected to said moving picture output device, for delaying the input moving picture signal to produce the intermediate moving picture signal in synchronism with the time constant signal.

26. A picture temporal frequency attenuating device as claimed in claim 22, the intermediate moving picture signal being represented by current picture data, wherein said picture temporal filtering section comprises:

first through N-th frame memories for storing first through N-th calculated frames indicative of first through N-th previous filtered picture data, respectively, where N represents a positive integer which is not less than two; and first through N-th calculation section connected to said picture temporal frequency component measuring section and connected to said first through said N-th frame memories, respectively, said first through said N-th calculation sections being connected to each other in cascade, said first calculation section calculating first current filtered picture data by using the current picture data, the first previous filtered picture data, and the time constant value in accordance with a predetermined equation, an n-th calculation section calculating n-th current filtered picture data by using n-th previous filtered picture data, (n−1)-th current filtered picture data, and the time constant value in accordance with the predetermined equation, where n represents a variable between 2 through N, both inclusive, said first through said N-th calculation sections supplying said first through said N-th frame memories with the first through the N-th calculated frames indicative of the first through the N-th current filtered picture data, respectively, said N-th calculation section producing the N-th calculated frame as the smoothly-changing moving picture signal.

27. A picture temporal frequency attenuating device as claimed in claim 22, wherein the particular temporal frequency band lies on a range not less than 7 Hz.

28. A picture temporal frequency attenuating device as claimed in claim 22, wherein the particular temporal frequency band lies on a range between 7 Hz and 60 Hz, both inclusive.

29. A picture temporal frequency attenuating device as claimed in claim 22, wherein the particular temporal frequency band lies on a range between 7 Hz and 15 Hz, both inclusive.

30. A picture temporal frequency attenuating device for adaptively attenuating a particular temporal frequency band of an input moving picture signal indicative of input moving pictures supplied from a moving picture output device to produce a smoothly-changing moving picture signal indicative of adaptively frequency attenuated moving pictures, the particular temporal frequency band including human sensitive frequency components, said picture temporal frequency attenuating device comprising:

a picture temporal frequency component measuring section, connected to said moving picture output device, for measuring magnitude of temporal changes in RGB components of the input moving picture singal, said picture temporal frequency component measuring section producing an intermediate moving picture signal and a time constant signal corresponding to the magnitude of the temporal changes; and a picture temporal filtering section, connected to said picture temporal frequency component measuring section, for carrying out, in response to the time constant signal, temporal filtering processing on the RGB components of the intermediate moving picture signal to adaptively attenuate the particular temporal frequency band of the intermediate moving picture signal, said picture temporal filtering section producing a temporally filtered moving picture signal as the smoothly-changing moving picture signal.

31. A picture temporal frequency attenuating device as claimed in claim 30, wherein the input moving picture signal is an analog signal.

32. A picture temporal frequency attenuating device as claimed in claim 30, wherein the input moving picture signal is a digital signal.

33. A picture temporal frequency attenuating device as claimed in claim 30, the input moving picture signal being represented by current picture data, wherein said picture temporal frequency component measuring section comprises:

a frame memory for storing a previous calculated frame indicative of previous calculated picture data;

a first calculating section, connected to said moving picture output device and said frame memory, for calculating current calculated picture data by using the current picture data, the previous calculated picture data, and a predetermined time constant in accordance with a first predetermined equation, said first calculating section supplying said frame memory with a current calculated frame indicative of the current calculated picture data;

a second calculating section, connected to said moving picture output device and said first calculating section, for calculating an effective attenuation by using the current picture data and the current calculated picture data in accordance with a second predetermined equation;

a time constant determining section, connected to said second calculating section, for determining a time constant value on the basis of the effective attenuation, said time constant determining section producing the time constant signal indicative of the time constant value; and a delay section, connected to said moving picture output device, for delaying the input moving picture signal to produce the intermediate moving picture signal in synchronism with the time constant signal.

34. A picture temporal frequency attenuating device as claimed in claim 32, the intermediate moving picture signal being represented by current picture data, wherein said picture temporal filtering section comprises:

first through N-th frame memories for storing first through N-th calculated frames indicative of first through N-th previous filtered picture data, respectively, where N represents a positive integer which is not less than two; and first through N-th calculation section connected to said picture temporal frequency component measuring section and connected to said first through said N-th frame memories, respectively, said first through said N-th calculation sections being connected to each other in cascade, said first calculation section calculating first current filtered picture data by using the current picture data, the first previous filtered picture data, and the time constant value in accordance with a predetermined equation, an n-th calculation section calculating n-th current filtered picture data by using n-th previous filtered picture data, (n−1)-th current filtered picture data, and the time constant value in accordance with the predetermined equation, where n represents a variable between 2 through N, both inclusive, said first through said N-th calculation sections supplying said first through said N-th frame memories with the first through the N-th calculated frames indicative of the first through the N-th current filtered picture data, respectively, said N-th calculation section producing the N-th calculated frame as the smoothly-changing moving picture signal.

35. A picture temporal frequency attenuating device as claimed in claim 30, wherein the particular temporal frequency band lies on a range not less than 7 Hz.

36. A picture temporal frequency attenuating device as claimed in claim 30, wherein the particular temporal frequency band lies on a range between 7 Hz and 60 Hz, both inclusive.

37. A picture temporal frequency attenuating device as claimed in claim 30, wherein the particular temporal frequency band lies on a range between 7 Hz and 15 Hz, both inclusive.

38. A method of adaptively attenuating a particular temporal frequency band of an input moving picture signal indicative of input moving pictures to produce a smoothly-changing moving picture signal indicative of adaptively frequency attenuated moving pictures, the particular temporal frequency band including human sensitive frequency components, said method comprising the steps of:

measuring magnitude of temporal changes in a luminance component of the input moving picture singal to produce an intermediate moving picture signal and a time constant signal corresponding to the magnitude of the temporal changes; and carrying out, in response to the time constant signal, temporal filtering processing on the luminance component of the intermediate moving picture signal to adaptively attenuate the particular temporal frequency band of the intermediate moving picture signal, thus producing a temporally filtered moving picture signal as the smoothly-changing moving picture signal.

39. A method as claimed in claim 38, wherein the input moving picture signal is an analog signal.

40. A method as claimed in claim 38, wherein the input moving picture signal is a digital signal.

41. A method as claimed in claim 39, wherein the particular temporal frequency band lies on a range not less than 7 Hz.

42. A method as claimed in claim 38, wherein the particular temporal frequency band lies on a range between 7 Hz and 60 Hz, both inclusive.

43. A method as claimed in claim 38, wherein the particular temporal frequency band lies on a range between 7 Hz and 15 Hz, both inclusive.

44. A method of adaptively attenuating a particular temporal frequency band of an input moving picture signal indicative of input moving pictures to produce a smoothly-changing moving picture signal indicative of adaptively frequency attenuated moving pictures, the particular temporal frequency band including human sensitive frequency components, said method comprising the steps of:

measuring magnitude of temporal changes in RGB components of the input moving picture singal to produce an intermediate moving picture signal and a time constant signal corresponding to the magnitude of the temporal changes; and carrying out, in response to the time constant signal, temporal filtering processing on the RGB components of the intermediate moving picture signal to adaptively attenuate the particular temporal frequency band of the intermediate moving picture signal, thus producing a temporally filtered moving picture signal as the smoothly-changing moving picture signal.

45. A method as claimed in claim 44, wherein the input moving picture signal is an analog signal.

46. A method as claimed in claim 44, wherein the input moving picture signal is a digital signal.

47. A method as claimed in claim 44, wherein the particular temporal frequency band lies on a range not less than 7 Hz.

48. A method as claimed in claim 44, wherein the particular temporal frequency band lies on a range between 7 Hz and 60 Hz, both inclusive.

49. A method as claimed in claim 44, wherein the particular temporal frequency band lies on a range between 7 Hz and 15 Hz, both inclusive.

* * * * *